US012707454B2

(12) United States Patent
Kassir et al.

(10) Patent No.: US 12,707,454 B2
(45) Date of Patent: Aug. 11, 2026

(54) RELAYING VIDEO FRAME DATA ACCORDING TO CHANNEL QUALITY

(71) Applicant: QUALCOMM Incorporated, San Diego, CA (US)

(72) Inventors: Saadallah Kassir, San Diego, CA (US); Yih-Hao Lin, San Diego, CA (US); Prashanth Haridas Hande, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 498 days.

(21) Appl. No.: 18/315,048

(22) Filed: May 10, 2023

(65) Prior Publication Data

US 2024/0381339 A1 Nov. 14, 2024

(51) Int. Cl.
*H04W 72/00* (2023.01)
*H04W 72/1263* (2023.01)
*H04W 72/543* (2023.01)

(52) U.S. Cl.
CPC ..... *H04W 72/1263* (2013.01); *H04W 72/543* (2023.01)

(58) Field of Classification Search
CPC ............ H04W 72/1263; H04W 72/543; H04L 65/752; H04L 65/765; H04L 65/80; H04L 65/70
See application file for complete search history.

(56) References Cited

U.S. PATENT DOCUMENTS

| | | | | |
|---|---|---|---|---|
| 7,724,640 B2 * | 5/2010 | Larsson | H04L 1/0002 | 370/216 |
| 2011/0141964 A1 * | 6/2011 | Ai | H04L 41/044 | 370/312 |
| 2015/0201042 A1 * | 7/2015 | Shah | H04L 65/612 | 709/219 |
| 2020/0099972 A1 * | 3/2020 | Gerosa | H04L 65/80 | |
| 2024/0348517 A1 * | 10/2024 | John | H04L 65/80 | |
| 2024/0373280 A1 * | 11/2024 | Karampatsis | H04L 45/74 | |

FOREIGN PATENT DOCUMENTS

WO WO-2020068218 A1 4/2020

OTHER PUBLICATIONS

International Search Report and Written Opinion—PCT/US2024/024267—ISA/EPO—Jun. 17, 2024.

* cited by examiner

*Primary Examiner* — Lakeram Jangbahadur
(74) *Attorney, Agent, or Firm* — Holland & Hart LLP

(57) ABSTRACT

Methods, systems, and devices for wireless communications are described. The described techniques provide for a network entity to modify data packets received from a server according to a manifest file. For example, the server may transmit a mapping scheme to the network entity indicating a mapping between one or more protocol data unit (PDU) sets associated with a video frame and one or more encoded data streams associated with the video frame. The network entity may identify the associations according to the mapping scheme, and may select which data streams to forward to a user equipment (UE) based on a channel link quality between the network entity and the UE. Additionally, or alternatively, the server may indicate one or more transcoding parameters in the manifest file, and the network entity may transcode the data stream according to the one or more transcoding parameters.

30 Claims, 10 Drawing Sheets

RELAYING VIDEO FRAME DATA ACCORDING TO CHANNEL QUALITY

FIELD OF TECHNOLOGY

The following relates to wireless communications, including relaying video frame data according to channel quality.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support relaying video frame data according to channel quality. For example, the described techniques enable a network entity to modify data packets received from a server according to a manifest file, which may reduce latency associated with a degraded channel link quality between the network entity and a user equipment (UE). For example, the server may transmit a mapping scheme (e.g., included in the manifest file) to the network entity indicating a mapping between one or more protocol data unit (PDU) sets associated with a video frame and one or more encoded data streams (which may be referred to as layers) associated with the video frame. As an example, the server may encode the video frame according to three data streams, which may each be associated with a respective PDU set. The network entity may identify the associations according to the mapping scheme, and may select which data streams to forward to the UE based on the degraded channel link quality. Additionally, or alternatively, the server may indicate one or more transcoding parameters in the manifest file, and the network entity may transcode the data stream according to the one or more transcoding parameters before forwarding to the UE.

A method for wireless communications at a network entity is described. The method may include receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame, receiving, from the server, the one or more data streams carrying the one or more PDU sets, and transmitting, to a UE, a second signal carrying at least a first PDU set of the one or more PDU sets based on a channel link quality between the network entity and the UE, the first PDU set corresponding to a first data stream of the one or more data streams in accordance with the mapping scheme.

An apparatus for wireless communications at a network entity is described. The apparatus may include a processor, memory coupled with the processor, and instructions stored in the memory. The instructions may be executable by the processor to cause the apparatus to receive, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame, receive, from the server, the one or more data streams carrying the one or more PDU sets, and transmit, to a UE, a second signal carrying at least a first PDU set of the one or more PDU sets based on a channel link quality between the network entity and the UE, the first PDU set corresponding to a first data stream of the one or more data streams in accordance with the mapping scheme.

Another apparatus for wireless communications at a network entity is described. The apparatus may include means for receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame, means for receiving, from the server, the one or more data streams carrying the one or more PDU sets, and means for transmitting, to a UE, a second signal carrying at least a first PDU set of the one or more PDU sets based on a channel link quality between the network entity and the UE, the first PDU set corresponding to a first data stream of the one or more data streams in accordance with the mapping scheme.

A non-transitory computer-readable medium storing code for wireless communications at a network entity is described. The code may include instructions executable by a processor to receive, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame, receive, from the server, the one or more data streams carrying the one or more PDU sets, and transmit, to a UE, a second signal carrying at least a first PDU set of the one or more PDU sets based on a channel link quality between the network entity and the UE, the first PDU set corresponding to a first data stream of the one or more data streams in accordance with the mapping scheme.

Some examples of the method, apparatuses, and non-transitory computer-readable medium described herein may further include operations, features, means, or instructions for receiving one or more messages from the UE and transmitting the second signal based on a change in the channel link quality based on the one or more messages.

Some examples of the method, apparatuses, and non-transitory computer-readable medium described herein may further include operations, features, means, or instructions for estimating a respective transmission delay for each data stream of the one or more data streams based on the one or more messages, where the second signal may be transmitted based on the respective transmission delay for each data stream.

In some examples of the method, apparatuses, and non-transitory computer-readable medium described herein, transmitting the second signal may include operations, features, means, or instructions for transmitting the second signal carrying at least the first PDU set according to a first coding rate that satisfies a threshold corresponding to the channel link quality, where the threshold may be based on the one or more messages.

Some examples of the method, apparatuses, and non-transitory computer-readable medium described herein may further include operations, features, means, or instructions for discarding one or more second PDU sets corresponding to one or more second data streams of the one or more data streams based on one or more second coding rates associated with the one or more second data streams failing to satisfy the threshold, where the one or more second PDU sets may be identified in accordance with the mapping scheme.

Some examples of the method, apparatuses, and non-transitory computer-readable medium described herein may further include operations, features, means, or instructions for detecting the change in the channel link quality based on a change detection algorithm, where the change detection algorithm may be based on the one or more messages.

In some examples of the method, apparatuses, and non-transitory computer-readable medium described herein, receiving the one or more messages may include operations, features, means, or instructions for receiving one or more sounding reference signals (SRSs) used to detect the change in the channel link quality.

In some examples of the method, apparatuses, and non-transitory computer-readable medium described herein, receiving the one or more messages may include operations, features, means, or instructions for receiving one or more feedback messages indicating channel quality information at the UE, where the change in the channel link quality may be detected based on the channel quality information.

In some examples of the method, apparatuses, and non-transitory computer-readable medium described herein, the mapping scheme indicates a correspondence between each data stream of the one or more data streams and a respective PDU set of the one or more PDU sets.

In some examples of the method, apparatuses, and non-transitory computer-readable medium described herein, receiving the first signal may include operations, features, means, or instructions for receiving, in the first signal, an indication of one or more transcoding parameters associated with the first data stream.

In some examples of the method, apparatuses, and non-transitory computer-readable medium described herein, the one or more transcoding parameters include a first bitrate used to transcode the one or more data streams and the method, apparatuses, and non-transitory computer-readable medium may include further operations, features, means, or instructions for transcoding the first data stream in accordance with a second bitrate different from the first bitrate based on the channel link quality.

Some examples of the method, apparatuses, and non-transitory computer-readable medium described herein may further include operations, features, means, or instructions for terminating a transmission of a third signal carrying the one or more PDU sets based on the third signal exceeding a PDU set delay budget.

Some examples of the method, apparatuses, and non-transitory computer-readable medium described herein may further include operations, features, means, or instructions for transmitting, to the server, an indication of a subset of the one or more data streams selected for the second signal, an indication of a bitrate associated with the second signal, or both.

Some examples of the method, apparatuses, and non-transitory computer-readable medium described herein may further include operations, features, means, or instructions for establishing an interface with the server using one or more network exposure functions (NEFs), the first signal received via the interface.

A method for wireless communications at a server is described. The method may include transmitting, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame and transmitting, to the network entity, the one or more data streams carrying the one or more PDU sets.

An apparatus for wireless communications at a server is described. The apparatus may include a processor, memory coupled with the processor, and instructions stored in the memory. The instructions may be executable by the processor to cause the apparatus to transmit, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame and transmit, to the network entity, the one or more data streams carrying the one or more PDU sets.

Another apparatus for wireless communications at a server is described. The apparatus may include means for transmitting, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame and means for transmitting, to the network entity, the one or more data streams carrying the one or more PDU sets.

A non-transitory computer-readable medium storing code for wireless communications at a server is described. The code may include instructions executable by a processor to transmit, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame and transmit, to the network entity, the one or more data streams carrying the one or more PDU sets.

Some examples of the method, apparatuses, and non-transitory computer-readable medium described herein may further include operations, features, means, or instructions for receiving, from the network entity, an indication that the network entity forwarded, to the UE, a second signal carrying at least a first PDU set of the one or more PDU sets based on a channel link quality between the network entity and the UE, the first PDU set corresponding to a first data stream in accordance with the mapping scheme.

Some examples of the method, apparatuses, and non-transitory computer-readable medium described herein may further include operations, features, means, or instructions for receiving, from the UE, an indication that a channel link quality between the network entity and the UE may have degraded and transmitting, to the network entity, a second signal carrying at least a subset of the one or more PDU sets based on the indication.

In some examples of the method, apparatuses, and non-transitory computer-readable medium described herein, the mapping scheme indicates a correspondence between each data stream of the one or more data streams and a respective PDU set of the one or more PDU sets.

Some examples of the method, apparatuses, and non-transitory computer-readable medium described herein may further include operations, features, means, or instructions for transmitting, in the first signal, an indication of one or more transcoding parameters associated with the first data stream.

Some examples of the method, apparatuses, and non-transitory computer-readable medium described herein may further include operations, features, means, or instructions for establishing an interface with the network entity using one or more NEFs, the first signal transmitted via the interface.

DETAILED DESCRIPTION

Figure 1:
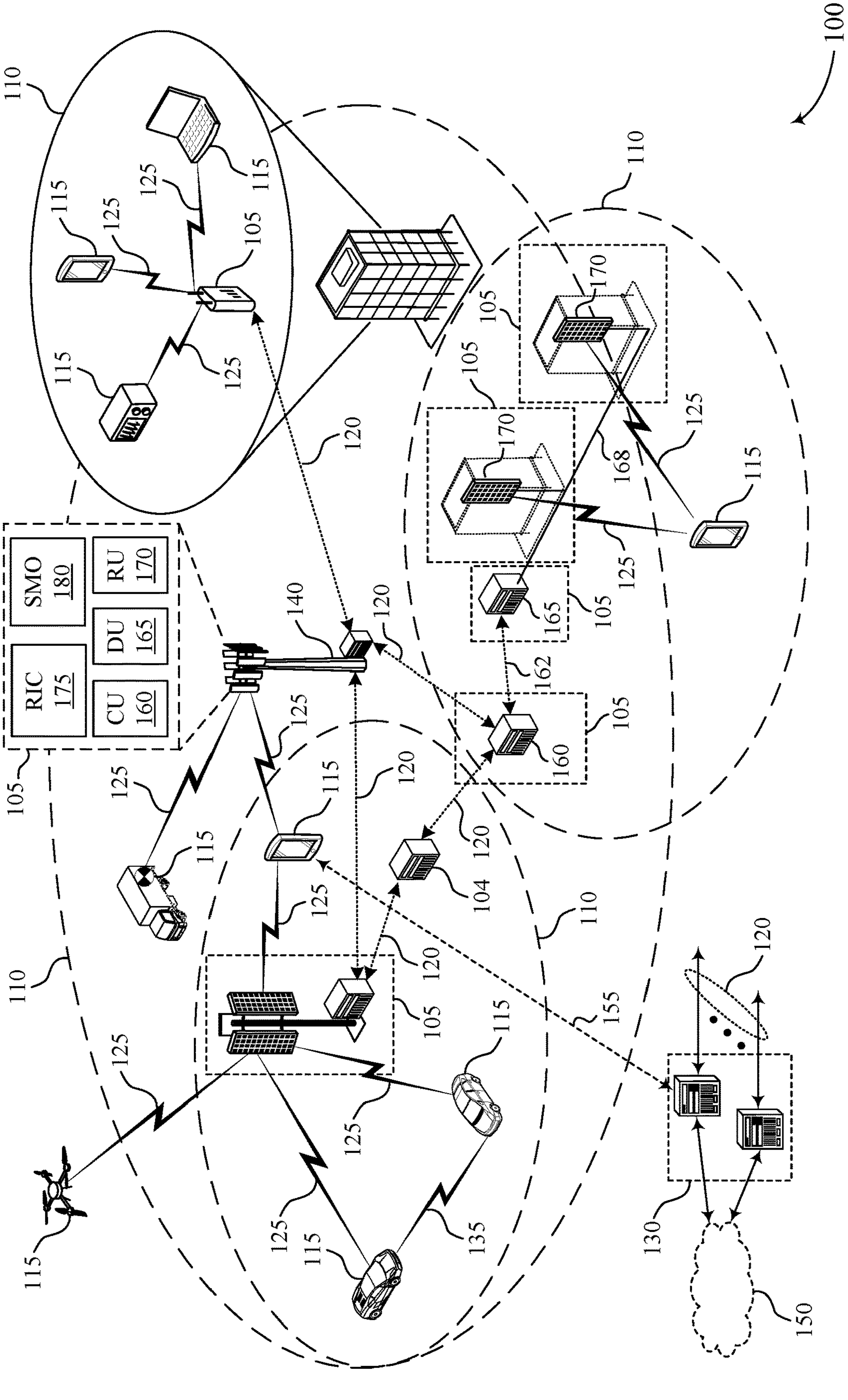
FIG. 1 shows an example of a wireless communications system that supports relaying video frame data according to channel quality in accordance with one or more aspects of the present disclosure.

In some cases, a server may transmit one or more data packets, such as protocol data unit (PDU) sets, to a network entity to be relayed to a user equipment (UE). For example, the network entity may receive, from the server, multiple PDU sets including data for a video frame intended for the UE (e.g., for extended reality (XR) services, cloud gaming (CG) services, or the like). In some examples, channel conditions between the network entity and a UE may be subject to variations, some of which may vary above a threshold within a given period of time or within a time window. For example, the network entity may identify that the channel link quality has degraded over a given duration (e.g., a threshold time period). To notify the server of such changes, the UE may indicate the channel link quality to the server, such as via periodic real-time transport control protocol (RTCP) feedback messages. In some cases, however, the channel link quality may degrade between the periodic RTCP feedback messages, and the server may be unaware of the change in channel link quality. For example, if the UE transmits an RTCP feedback message indicating a strong channel link quality and the channel link quality degrades prior to a subsequent RTCP feedback message, the network entity may continue to receive data packets from the server that are encoded as if the channel quality had not degraded. Such data packets may accumulate in a buffer of the network entity, which may incur latency due to communicating relatively large data packets via relatively weak channel conditions.

To support forwarding relatively large data packets to a UE via a degraded channel link quality, a network entity may modify data packets received from a server according to a manifest file, which may include one or more parameters for such modifications. For example, the server may transmit a mapping scheme (e.g., included in the manifest file) to the network entity indicating a mapping between one or more PDU sets associated with a video frame and one or more encoded data streams (which may be referred to as layers) associated with the video frame. For example, the server may encode the video frame according to three data streams, which may each be associated with a respective PDU set. The network entity may identify the associations according to the mapping scheme, and may select which data streams to forward to the UE based on the degraded channel link quality. Additionally, or alternatively, the server may indicate one or more transcoding parameters in the manifest file. For example, the server may encode a single data stream that is associated with multiple PDU sets, and the network entity may transcode the data stream (e.g., to a lower bitrate) according to the one or more transcoding parameters. Such techniques may mitigate latency associated with the network entity forwarding relatively large data packets to the UE despite a degraded channel link quality.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to relaying video frame data according to channel quality.

FIG. 1 shows an example of a wireless communications system 100 that supports relaying video frame data according to channel quality in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support relaying video frame data according to channel quality as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, such as the wireless communications system 100, wireless devices may support one or more applications that have strict quality of service (QOS) constraints or a target QoS. For example, a UE 115 may perform applications such as XR services (e.g., virtual reality (VR), augmented reality (AR), mixed reality (MR), or the like) and CG services (e.g., 5G NR use cases), which may be associated with a relatively low latency, a relatively high reliability, a relatively high bandwidth usage, or a combination thereof. In some examples, a server (e.g., a data server or a game server) may encode data for such applications and may transmit the encoded data to a network entity 105 to be relayed to the UE 115. For example, the UE 115 may receive data packets (e.g., downlink traffic) including data for a real-time video feed from the server (e.g., forwarded by the network entity 105).

In some cases, the UE 115 may transmit one or more messages (e.g., uplink traffic) including control information associated with the XR or CG applications. For example, the UE 115 may transmit periodic messages to the server indicating a current position of the UE 115. As another example, the UE 115 may periodically measure or estimate a channel link quality of a wireless channel between the UE 115 and the network entity 105, and may transmit periodic messages indicating the measured channel link quality to the server via RTCP signaling (e.g., an indication of round trip time (RTT), data rate measurements, or both). In some examples, the server may receive the control information and may adapt the content of a video frame, a quality of the video frame, or both according to the control information. For example, if the server receives a message from the UE 115 indicating a relatively weak channel link quality, the server may reduce a bitrate associated with the video frame to support the network entity 105 forwarding the video frame to the UE 115. Such techniques may support adapting downlink traffic according to relatively slow variations in the channel link quality, and may mitigate video packet queuing at the network entity 105 (e.g., maintaining a shallow buffer at the network entity 105).

In some cases, however, a channel link quality of a wireless channel (e.g., a 5G NR wireless channel) between a UE 115 and a network entity 105 may vary relatively sharply (e.g., a variation or change in channel quality may exceed a threshold variation or threshold delta over a threshold duration of time (e.g., within a time window)). For example, the channel link quality may degrade due to one or more conditions associated with the wireless channel. The one or more conditions may include a frequency range of the channel (e.g., millimeter wave frequencies, frequencies below 6 GHZ), the usage of beamformed communications, blockage (e.g., physical obstructions), environmental motion (e.g., a physical repositioning of wireless devices), or any combination thereof, among other examples. In some examples, wireless devices (e.g., the UE 115 and the network entity 105) may perform one or more beam recovery techniques in response to the degraded channel quality. However, such techniques may increase latency or may be unsuccessful. For instance, a duration associated with a beam recovery technique (e.g., greater than 100 ms) may result in one or more video frames being lost or otherwise failing to satisfy a packet delay budget (PDB) (e.g., at 60 frames per second, a 200 ms link interruption may correspond to 12 consecutive video frames that are vulnerable to being lost or failing to satisfy the PDB).

Additionally, or alternatively, communication of application-layer link quality estimation messages from the UE 115 and video rate adaptation by the server (e.g., periodic RTCP feedback) may be relatively slow to detect channel link quality changes. For example, if the channel link quality degrades in between periodic RTCP feedback messages (e.g., a stale period between the channel link quality change and detection of the change), the server may fail to adapt the video rate for the degraded channel link quality until receiving a subsequent RTCP feedback message (e.g., by the time a sharp channel link quality change is detected, the server may have transmitted one or more video frames encoded as if the channel link quality had not degraded).

Thus, video packets may accumulate in a buffer of the network entity 105 (e.g., a bottleneck effect), and the network entity 105 may attempt to forward the video packets to the UE 115 via an air interface (e.g., the wireless channel between the network entity 105 and the UE 115) despite the degraded channel link quality. For example, the network entity 105 may transmit the video frames (e.g., encoded as if the channel link quality has not degraded) to the UE 115 relatively slowly due to the degraded channel link quality, which may incur high-latency delivery of the video frames to the UE 115 (which may be exacerbated if the UE 115 is a cell-edge user). Additionally, video frames that are adapted according to the channel link quality (e.g., after the server receives RTCP feedback indicating the degraded channel link quality) may be queued behind the accumulated (un-adapted) video frames in the buffer of the network entity 105, which may further delay communications to the UE 115.

To mitigate or reduce latency when forwarding data packets to the UE 115 (e.g., when channel link quality has degraded below a threshold channel quality), the network entity 105 may modify data packets received from the server according to information received from the server, for example within a manifest file, which may include one or more parameters for such modifications. For example, the server may transmit a mapping scheme (e.g., included in the manifest file) to the network entity 105, where the mapping scheme indicates a mapping between one or more PDU sets associated with a video frame and one or more encoded data streams (which may be referred to as layers) associated with the video frame. For example, the server may encode the video frame according to three data streams, which may each be associated with a respective PDU set and the network entity 105 may select which data streams (e.g., and corresponding PDU sets) to forward to the UE 115 based on the degraded channel link quality. Additionally, or alternatively, the server may indicate one or more transcoding parameters in the manifest file and the network entity 105 may transcode a data stream (e.g., to a lower bitrate) according to the one or more transcoding parameters. Such techniques may mitigate latency associated with the network entity 105 forwarding relatively large data packets to the UE 115 via an air interface with degraded channel link quality.

Figure 2:
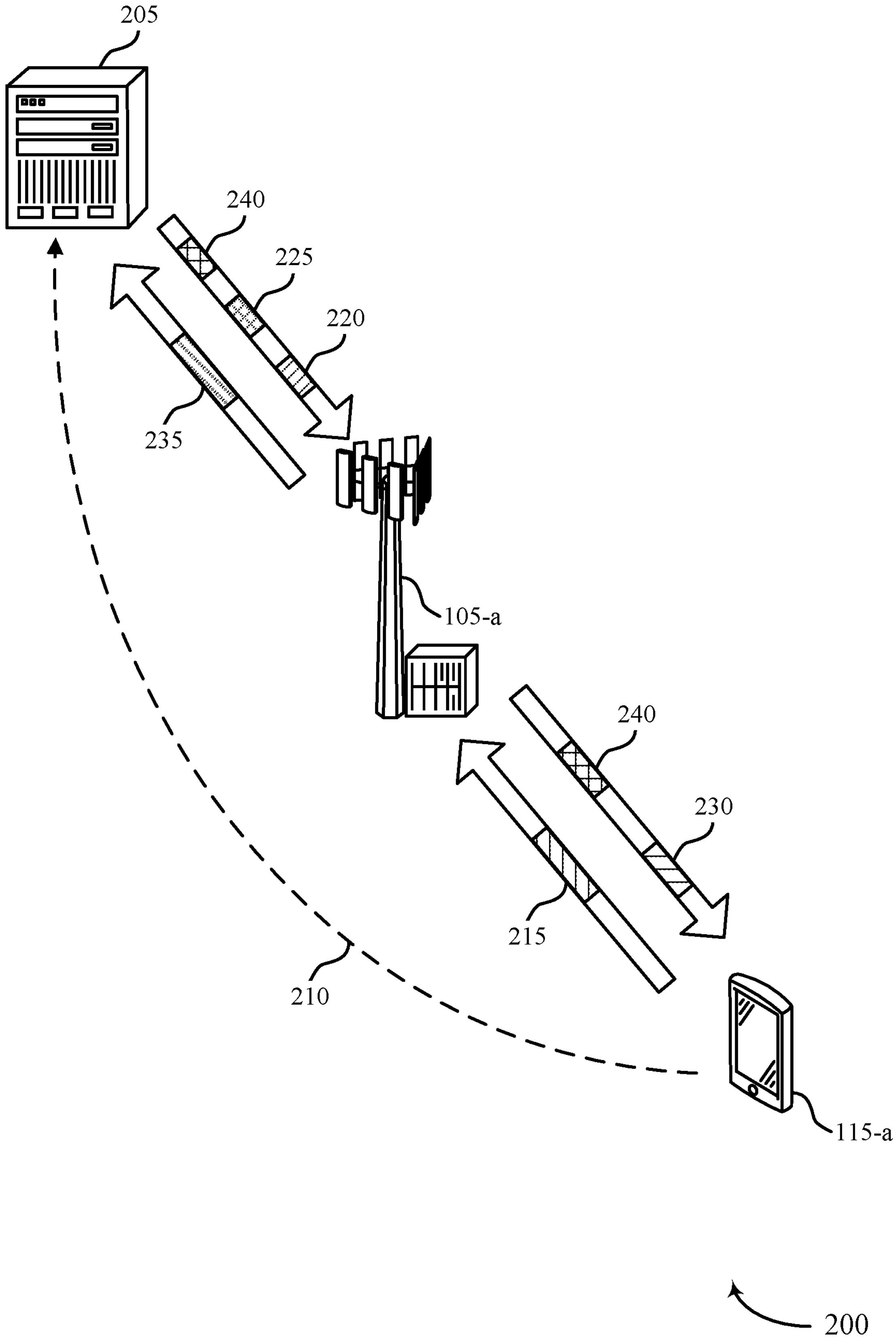
FIG. 2 shows an example of a wireless communications system that supports relaying video frame data according to channel quality in accordance with one or more aspects of the present disclosure.

FIG. 2 shows an example of a wireless communications system 200 that supports relaying video frame data according to channel quality in accordance with one or more aspects of the present disclosure. In some examples, the wireless communications system 200 may implement one or more aspects of the wireless communications system 100. For example, the wireless communications system 200 may include a network entity 105-*a*, a UE 115-*a*, and a server 205, which may be examples of corresponding devices described with reference to FIG. 1. In some cases, the wireless communications system 200 may support the server 205 encoding data packets intended for the UE 115-*a*, which may be relayed by the network entity 105-*a*. Additionally, or alternatively, the wireless communications system 200 may support the network entity 105-*a* modifying data packets according to a channel link quality of a wireless channel between the network entity 105-*a* and the UE 115-*a*.

In some examples, the UE 115-*a* may support one or more applications (e.g., video playback, audio playback, voice communications, and the like), and may receive application data from a network device (e.g., the network entity 105-*a* or the server 205) to facilitate execution of an application. In some cases, the UE 115-*a* may begin processing data for an application when a threshold quantity of bits (e.g., a minimum granularity) of the application data are available to the UE 115-*a*. For example, in some configurations, the UE 115-*a* may refrain from processing the application data until the threshold quantity of bits (e.g., all of the bits or a threshold percentage of the bits) of the application data are available at the UE 115-*a*.

In some examples, the network device may partition application data (e.g., packetize the data) into one or more packets (e.g., IP payloads), which may be referred to as PDUs. However, the threshold quantity of bits to begin processing some applications (e.g., the minimum granularity) supported by the UE 115-*a* may be larger than a quantity of bits associated with each PDU. Accordingly, the network device may group multiple PDUs into a PDU set, which may satisfy the threshold quantity of bits for the UE 115-*a* to begin processing the application data. Additionally, or alternatively, for some applications (e.g., XR or CG applications), traffic carrying application data may include bursts of data that include one or more PDU sets (e.g., a set of packets that are jointly processed for applications). For example, the UE 115-*a* may receive a first data burst including a first PDU set and a second PDU set (e.g., received at approximately a same time), may receive a second data burst including a third PDU set, a fourth PDU set, and a fifth PDU set, and may receive a third data burst including a sixth PDU set.

In some examples, the network device may encode application data using one or more data streams (which may be referred to as layers). For example, the network device may encode the application data using scalable video coding (SVC) techniques, where portions of application data may be communicated using respective data streams. In some cases, each data stream may carry additional video frames (e.g., to increase a framerate), may carry additional bits for a video frame (e.g., to increase a bitrate, a quantity of bits per pixel, or both), may carry additional pixels for a video frame (e.g., to increase a resolution of the frame), or any combination thereof. For example, a first data stream may correspond to a first frame rate (e.g., 20 frames per second), a second data stream may correspond to a second frame rate (e.g., 20 frames per second), and a third data stream may correspond to a third frame rate (e.g., 20 frames per second). In such an example, a frame rate of the application processed by the UE 115-*a* may correspond to a quantity of data streams received by the UE 115-*a* (e.g., receiving one layer corresponds to 20 frames per second, receiving two layer corresponds to 40 frames per second, and receiving three layers corresponds to 60 frames per second).

In some examples, the server 205 may encode application data intended for the UE 115-*a* and the network entity 105-*a* may relay the application data to the UE 115-*a*. For example, the server 205 and the network entity 105-*a* may establish an interface using one or more network exposure functions (NEFs) to communicate the application layer data. The network entity 105-*a* may then forward the application data to the UE 115-*a* via an air interface (e.g., downlink signaling).

In some cases, channel conditions between the network entity 105-*a* and the UE 115-*a* (e.g., a channel link quality of the air interface) may change or be subject to relatively large variations. In some cases, the network entity 105-*a* may determine one or more channel quality measurements according to one or more messages 215 received from the UE 115-*a*. For example, the UE 115-*a* may transmit sounding reference signals (SRSs) in the one or more messages 215, and the network entity 105-*a* may measure the SRSs to determine a channel quality measurement. Additionally, or alternatively, the UE 115-*a* may transmit feedback messages indicating channel quality measurements (e.g., channel state information reference signal (CSI-RS) feedback) in the one or more messages 215.

In some examples, the network entity 105-*a* (or the UE 115-*a*) may identify changes in channel conditions according to a change detection algorithm and the one or more channel quality measurements. For example, the network entity 105-*a* may identify a first parameter corresponding to a change detection window, W (e.g., CD_WINDOW=W), may identify a second parameter correspond to a change detection sensitivity, η (e.g., CD_SENSITIVITY=η), and may determine a change in channel link quality, $x_i$, at a current time, i, using one or more techniques.

As a first example, the network entity 105-*a* may compute a mean, $\mu_i$, and a standard deviation, $\sigma_i$, for channel quality measurements over a last W received samples (e.g., received SRSs or CSI-RS feedback messages). In such an example, the network entity 105-*a* may detect an increase in a strength of the channel link quality if $x_i>\mu_{i-1}+\eta*\sigma_i$ and may detect a decrease in the strength of the channel link quality if $x_i<\mu_{i-1}-\eta*\sigma_i$. As a second example, the network entity 105-*a* may detect an increase in the strength of the channel link quality if $$\frac{x_i - x_{i-W}}{x_{i-W}} > \eta$$

and may detect a decrease in the strength of the channel link quality if $$\frac{x_i - x_{i-W}}{x_{i-W}} < \eta.$$

In some examples, the network entity 105-*a* may reset the change detection window, W, when a change in channel link quality is detected.

To indicate the channel conditions to the server 205, the UE 115-*a* (or the network entity 105-*a*) may transmit periodic RTCP feedback 210, which may indicate RTT information, data rate measurements, or the like. However, a periodicity of the RTCP feedback 210 reporting may result in a degradation of the channel link quality being undetected by the server 205, such as if the channel link quality degrades in between periodic RTCP feedback 210 reporting. In such an example, the server 205 may continue to encode application data as if the channel link quality had not degraded (e.g., encoded with a relatively high bitrate). Such application data may accumulate in a buffer of the network entity 105-*a*, which may increase latency when forwarding the application data to the UE 115-*a* (e.g., transmitted relatively slowly due to the degraded channel link quality).

In some examples, the network entity 105-*a* may modify application data (e.g., PDU sets associated with a video frame) received from the server 205 to accommodate degraded channel conditions. In some cases, the server 205 may transmit a manifest file 220 to the network entity 105-*a* to support such modifications. For example, the manifest file 220 may indicate a quantity of one or more data streams associated with a video frame (e.g., according to SVC) and may indicate a mapping scheme that maps one or more PDU sets of the video frame to the one or more data streams. In some cases, the network entity 105-*a* may selectively forward at least one data stream (e.g., carrying at least a first PDU set), where the at least one data stream may be selected using techniques described further below with reference to FIG. 3. Additionally, or alternatively, the manifest file 220 may indicate transcoding parameters for a data stream associated with the video frame. In such examples, the network entity 105-*a* may transcode the data stream (e.g., from a higher bitrate to a lower bitrate) according to the transcoding parameters using techniques described further below with reference to FIG. 4.

As an example, the server 205 may transmit first application data 225 to the network entity 105-*a*, which may be an example of a video frame that is encoded with a relatively high data rate. For example, the server 205 may receive a first RTCP feedback 210 report indicating a relatively strong channel link quality between the network entity 105-*a* and the UE 115-*a*, and may encode the first application data 225 based on the relatively strong channel link quality. In some cases, the network entity 105-*a* may receive the first application data 225 and may identify that the channel link quality has degraded (e.g., using the change detection algorithm). The network entity 105-*a* may modify the first application data 225 according to the manifest file 220 (e.g., selective forwarding or transcoding), and may transmit modified application data 230 to the UE 115-*a* (e.g., a modification of the first application data 225 to accommodate the degraded channel link quality).

In some cases, the network entity 105-*a* may transmit a message 235 to the server 205 indicating the modifications made to the first application data 225 (e.g., data stream selection, transcoded video frames, or both). In such cases, the server 205 may use the information included in the message 235 to adapt the encoding of subsequent application data (e.g., inserting one or more I-frames (intra-coded picture frames) or adjusting an I-frame reference), which may mitigate or reduce leakage, drift, or both for the subsequent application data.

In some examples, the server 205 may receive a second RTCP feedback 210 report indicating that the channel link quality has degraded. In such examples, the server 205 may transmit second application data 240 to the network entity 105-*a*, which may be an example of a video frame that is encoded with a relatively low data rate (e.g., compared to the first application data 225) due to the degraded channel link quality. The network entity 105-*a* may receive the second application data 240 and may forward the second application data 240 to the UE 115-*a* (e.g., without modification or with less significant modification).

Figure 3:
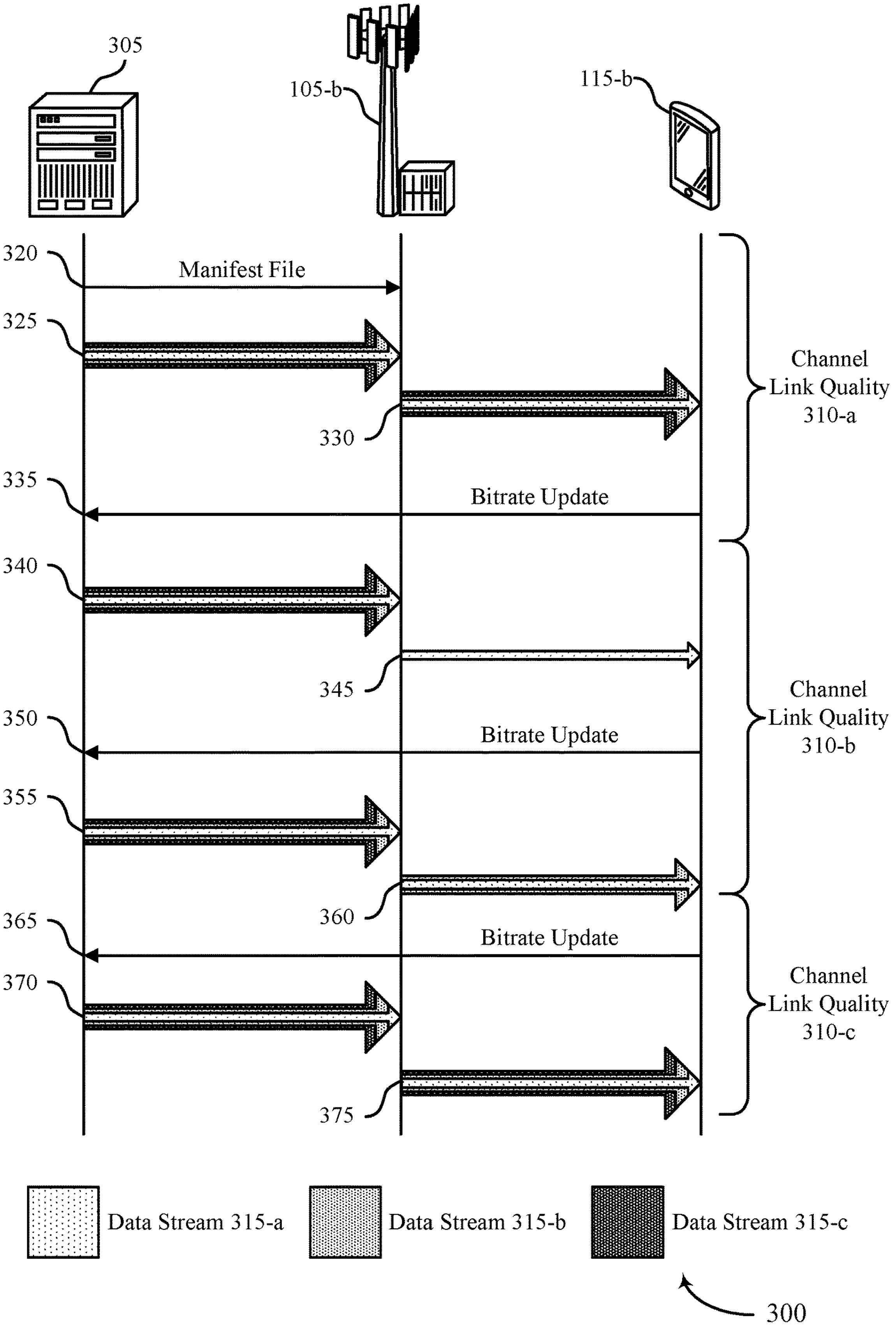
FIG. 3 shows an example of a process flow that supports relaying video frame data according to channel quality in accordance with one or more aspects of the present disclosure.

FIG. 3 shows an example of a process flow 300 that supports relaying video frame data according to channel quality in accordance with one or more aspects of the present disclosure. In some cases, the process flow 300 may be implemented by one or more aspects of the wireless communications system 100 and the wireless communications system 200. For example, the process flow 300 may include signaling between a server 305, a network entity 105-*b*, and a UE 115-*b*, which may be examples of corresponding devices described with reference to FIGS. 1 and 2. The process flow 300 may support the network entity 105-*a* selectively forwarding PDU sets to the UE 115-*b* according to a mapping between PDU sets and data streams.

In some examples, channel conditions between the network entity 105-*b* and the UE 115-*b* may vary between one or more channel link qualities 310, such as a channel link quality 310-*a*, a channel link quality 310-*b*, and a channel link quality 310-*c*, which may represent various strengths of the channel conditions. In some cases, the server 305, the network entity 105-*b*, and the UE 115-*b* may communicate application data via one or more data streams 315, such as a data stream 315-*a*, a data stream 315-*b*, and a data stream 315-*c*. Alternative examples of the following may be implemented, where some processes are performed in a different order than described or are not performed. In some cases, processes may include additional features not mentioned below, or further processes may be added.

At 320, the server 305 may transmit a manifest file to the network entity 105-*b*. For example, the server 305 may transmit the manifest file at a beginning of a session with the network entity 105-*b* (e.g., after establishing an interface using one or more NEFs) to configure the network entity 105-*b* (e.g., semi-statically). In some cases, the manifest file may indicate a quantity of the data streams 315 that the server 305 will use to transmit one or more PDU sets for a video frame and may indicate a mapping scheme that maps the data streams 315 to the one or more PDU sets. For example, the manifest file may indicate three data streams 315 (e.g., the data stream 315-*a*, the data stream 315-*b*, and the data stream 315-*c*) and may indicate that each data stream corresponds to a respective PDU set of the one or more PDU sets. In such an example, the network entity 105-*b* may identify an ID of each data stream 315 according to a sequence number of each PDU set (e.g., layer_id=PDU_set_SN % 3) and may identify a sequence number of a frame according to the sequence number of each PDU set (e.g., frame_SN=floor (PDU_set_SN/3)).

At 325, the server 305 may transmit application data (e.g., video frame data) to the network entity 105-*b* using each of the data stream 315-*a*, the data stream 315-*b*, and the data stream 315-*c*. In some cases, each data stream 315 may correspond to a respective PDU set associated with the application data (e.g., according to the mapping scheme).

At 330, the network entity 105-*b* may relay, to the UE 115-*b*, the application data received from the server 305. In some examples, the network entity 105-*b* may not modify the application data based on a current channel link quality between the network entity 105-*b* and the UE 115-*b*. For example, the network entity 105-*b* may identify the current channel link quality as the channel link quality 310-*a* (e.g., a relatively strong channel link quality), and may forward each of the data stream 315-*a*, the data stream 315-*b*, and the data stream 315-*c* to the UE 115-*b*.

At 335, the UE 115-*b* may transmit, to the server 305, a bitrate update. In some cases, the bitrate update may be a periodic RTCP feedback report indicating a current channel link quality between the UE 115-*b* and the network entity 105-*b*. For example, the UE 115-*b* may identify the current channel link quality as the channel link quality 310-*a*, and may indicate a relatively strong channel link quality in the bitrate update.

In some cases, the channel link quality between the UE 115-*b* and the network entity 105-*b* may change from the channel link quality 310-*a* (e.g., a relatively strong channel link quality) to the channel link quality 310-*b* (e.g., a relatively weak channel link quality). In some examples, the channel link quality may change in between periodic RTCP feedback reports (e.g., relatively soon after the UE 115-*b* transmits the bitrate update to the server 305), which may result in the server 305 being unaware of the change for a duration (e.g., a stale period until a next RTCP feedback report). In some cases, the network entity 105-*b* may identify the change in the channel link quality according to one or more messages received from the UE 115-*b* (e.g., SRS measurements or CSI-RS feedback reports). For example, the network entity 105-*b* may use the one or more messages as inputs to a change detection algorithm to identify the change in the channel link quality, which may support the network entity 105-*b* detecting the change before the server 305 (e.g., before a subsequent RTCP feedback message).

At 340, the server 305 may transmit application data (e.g., video frame data) to the network entity 105-*b* using each of the data stream 315-*a*, the data stream 315-*b*, and the data stream 315-*c*. In some cases, each data stream 315 may correspond to a respective PDU set associated with the application data (e.g., according to the mapping scheme).

At 345, the network entity 105-*b* may relay, to the UE 115-*b*, the application data received from the server 305 using at least one of the data streams 315. In some cases, the network entity 105-*b* may modify the application data prior to relaying the application data based on detecting that the channel link quality has degraded from the channel link quality 310-*a* to the channel link quality 310-*b*. The network entity 105-*b* may select a subset of the data streams 315 to forward to the UE 115-*b*, which may support relaying the application data via the degraded wireless channel. For example, the network entity 105-*b* may select the data stream 315-*a* to forward to the UE 115-*b* (e.g., discarding PDU sets associated with the data stream 315-*b* and the data stream 315-*c*).

To select which data streams 315 to forward to the UE 115-*b*, the network entity 105-*b* may estimate a transmission delay associated with each encoded data stream 315, may determine a coding rate associated with each data stream 315, or both. For example, the network entity 105-*b* may compare each estimated transmission delay to a threshold corresponding to the channel link quality 310-*b* (e.g., a QoS constraint or a PDB constraint). Additionally, or alternatively, the network entity 105-*b* may select data streams 315 to forward to the UE 115-*b* according to a coding rate associated with each data stream 315. For example, the network entity 105-*b* may decide to forward the data streams 315 that are encoded at a highest rate (e.g., relative to other data streams 315) and satisfy the threshold corresponding to the channel link quality 310-*b*. In some cases, the network entity 105-*b* may discard PDU sets corresponding to non-selected data streams 315. For example, the network entity 105-*b* may determine to forward the data stream 315-*a* (e.g., due to a coding rate and an estimated transmission delay of the data stream 315-*a*) to the UE 115-*b*, and may discard PDU sets corresponding to the data stream 315-*b* and the data stream 315-*c* according to the mapping scheme (e.g., by looking up the relevant PDU IDs in the manifest file).

Additionally, or alternatively, the network entity 105-*b* may terminate (e.g., interrupt, preempt, or the like) a data transmission prior to modifying the application data. For example, the network entity 105-*b* may begin to forward the application data using each of the data stream data stream 315-*a*, the data stream 315-*b*, and the data stream 315-*c*, and may terminate the transmission in response to the application data exceeding a PDU set delay budget. In such an example, the network entity 105-*b* may discard PDU sets associated with the application data, and may retransmit the modified application data (e.g., selectively forwarding a subset of the data streams 315).

At 350, the UE 115-*b* may transmit, to the server 305, a bitrate update. In some cases, the bitrate update may be a periodic RTCP feedback report indicating a current channel link quality between the UE 115-*b* and the network entity 105-*b*. For example, the UE 115-*b* may identify the current channel link quality as the channel link quality 310-*b*, and may indicate a relatively weak channel link quality in the bitrate update.

At 355, the server 305 may transmit application data to the network entity 105-*b*. In some cases, the application data may be encoded to accommodate the channel link quality 310-*b* (e.g., a relatively weak channel link quality) based on the server 305 receiving the bitrate update. For example, the server 305 may encode the data streams 315 according to a lower coding rate, may transmit a subset of the PDU sets associated with the data streams 315, or a combination thereof.

At 360, the network entity 105-*b* may forward the application data to the UE 115-*b*. In some cases, the network entity 105-*b* may use one or more data streams 315 (e.g., a subset of the data streams 315 or all the data streams 315) to forward the application data to the UE 115-*b*. For example, the network entity 105-*b* may transmit, to the UE 115-*b*, PDU sets corresponding to the data stream 315-*a* and the data stream 315-*b* (e.g., due to the server 305 encoding the data streams according to channel link quality 310-*b*). As another example, the network entity 105-*b* may forward each of the data stream 315-*a*, the data stream 315-*b*, and the data stream 315-*c* to the UE 115-*b* (e.g., despite the degraded channel link quality).

In some cases, the channel link quality between the UE 115-*b* and the network entity 105-*b* may change from the channel link quality 310-*b* (e.g., a relatively weak channel link quality) to the channel link quality 310-*c* (e.g., a relatively strong channel link quality).

At 365, the UE 115-*b* may transmit, to the server 305, a bitrate update. In some cases, the bitrate update may be a periodic RTCP feedback report indicating a current channel link quality between the UE 115-*b* and the network entity 105-*b*. For example, the UE 115-*b* may identify the current channel link quality as the channel link quality 310-*c*, and may indicate a relatively strong channel link quality in the bitrate update.

At 370, the server 305 may transmit application data (e.g., video frame data) to the network entity 105-*b* using each of the data stream 315-*a*, the data stream 315-*b*, and the data stream 315-*c*. In some cases, each data stream 315 may correspond to a respective PDU set associated with the application data (e.g., according to the mapping scheme). In some examples, the server 305 may encode each data stream 315 according to the relatively strong channel link quality 310-*c* based on receiving the bitrate update.

At 375, the network entity 105-*b* may relay, to the UE 115-*b*, the application data received from the server 305. In some examples, the network entity 105-*b* may not modify the application data based on a current channel link quality between the network entity 105-*b* and the UE 115-*b*. For example, the network entity 105-*b* may identify the current channel link quality as the channel link quality 310-*c* (e.g., a relatively strong channel link quality), and may forward each of the data stream 315-*a*, the data stream 315-*b*, and the data stream 315-*c* to the UE 115-*b*.

Figure 4:
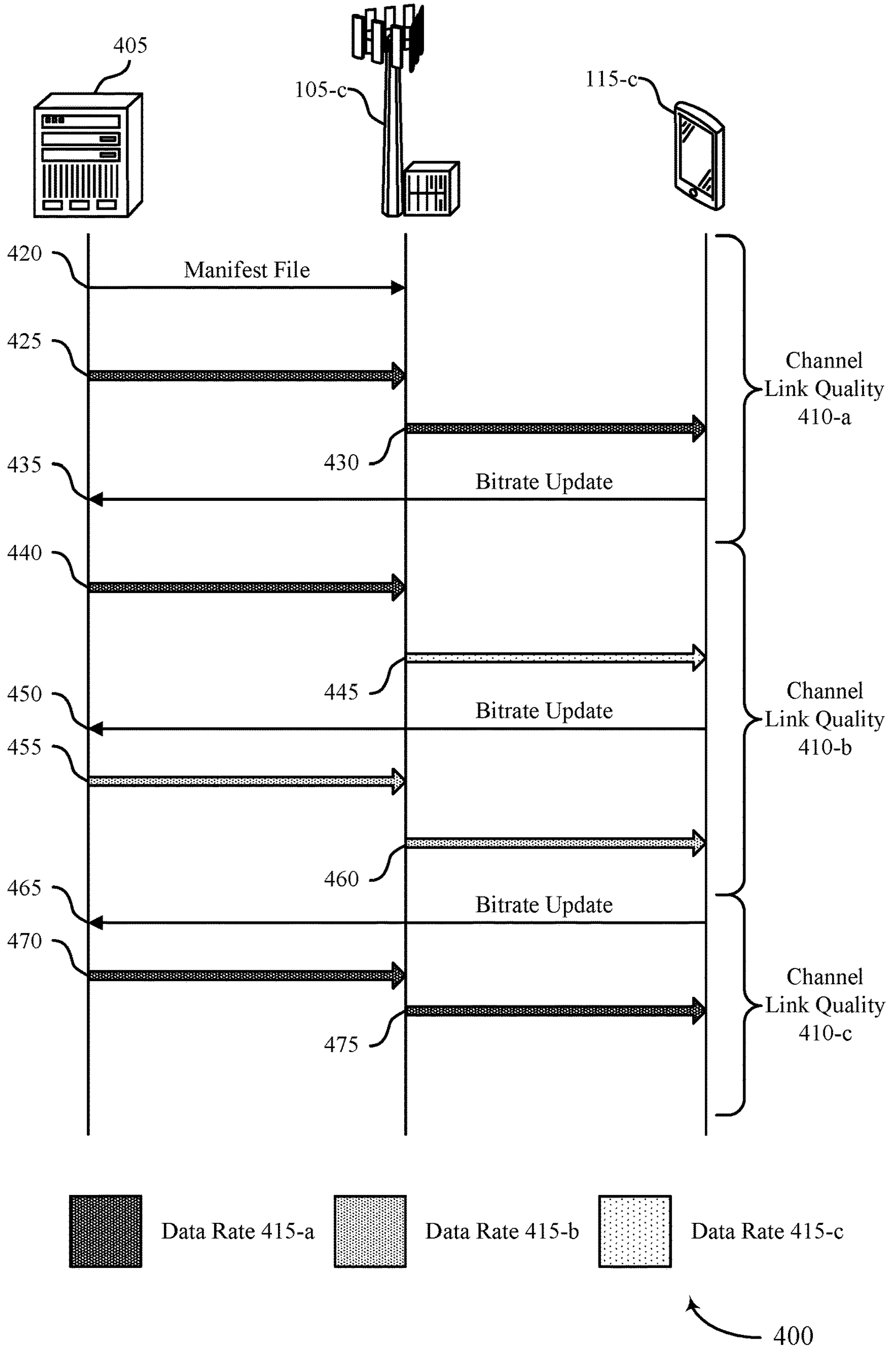
FIG. 4 shows an example of a process flow that supports relaying video frame data according to channel quality in accordance with one or more aspects of the present disclosure.

FIG. 4 shows an example of a process flow 400 that supports relaying video frame data according to channel quality in accordance with one or more aspects of the present disclosure. In some cases, the process flow 400 may be implemented by one or more aspects of the wireless communications system 100 and the wireless communications system 200. For example, the process flow 400 may include signaling between a server 405, a network entity 105-*c*, and a UE 115-*c*, which may be examples of corresponding devices described with reference to FIGS. 1 and 2. The process flow 400 may support the network entity 105-*c* transcoding a data stream to forward application data to the UE 115-*c* according to transcoding parameters from the server 405.

In some examples, channel conditions between the network entity 105-*c* and the UE 115-*c* may vary between one or more channel link qualities 410, such as a channel link quality 410-*a*, a channel link quality 410-*b*, and a channel link quality 410-*c*, which may represent various strengths of the channel conditions. In some cases, the server 405, the network entity 105-*c*, and the UE 115-*c* may communicate application data according to one or more data rates 415 (e.g., bitrates), such as a data rate 415-*a*, a data rate 415-*b*, and a data rate 415-*c*. Alternative examples of the following may be implemented, where some processes are performed in a different order than described or are not performed. In some cases, processes may include additional features not mentioned below, or further processes may be added.

At 420, the server 405 may transmit a manifest file to the network entity 105-*c*. For example, the server 405 may transmit the manifest file at a beginning of a session with the network entity 105-*c* (e.g., after establishing an interface using one or more NEFs) to configure the network entity 105-*c* (e.g., a semi-static configuration). In some cases, the manifest file may indicate one or more parameters associated with encoding of a data stream, transcoding of the data stream (e.g., to support the network entity 105-*c* modifying a bitrate of the data stream), or both.

At 425, the server 405 may transmit application data (e.g., data for a video frame) to the network entity 105-*c* according to the data rate 415-*a*. In some cases, the server 405 may use one or more data streams (e.g., a single data stream or multiple data streams) to transmit the application data. For example, the server 405 may transmit a single data stream carrying multiple PDU sets associated with the application data, which may be encoded according to the data rate 415-*a* (e.g., a relatively high bitrate).

At 430, the network entity 105-*c* may relay, to the UE 115-*c*, the application data received from the server 405. In some examples, the network entity 105-*c* may not modify the application data based on a current channel link quality between the network entity 105-*c* and the UE 115-*c*. For example, the network entity 105-*c* may identify the current channel link quality as the channel link quality 410-*a* (e.g., a relatively strong channel link quality), and may forward the application data to the UE 115-*c* according to the data rate 415-*a*.

At 435, the UE 115-*c* may transmit, to the server 405, a bitrate update. In some cases, the bitrate update may be a periodic RTCP feedback report indicating a current channel link quality between the UE 115-*c* and the network entity 105-*c*. For example, the UE 115-*c* may identify the current channel link quality as the channel link quality 410-*a*, and may indicate a relatively strong channel link quality in the bitrate update.

In some cases, the channel link quality between the UE 115-*c* and the network entity 105-*c* may change from the channel link quality 410-*a* (e.g., a relatively strong channel link quality) to the channel link quality 410-*b* (e.g., a relatively weak channel link quality). In some examples, the channel link quality may change in between periodic RTCP feedback reports (e.g., relatively soon after the UE 115-*c* transmits the bitrate update to the server 405), which may result in the server 405 being unaware of the change for a duration (e.g., a stale period until a next RTCP feedback report). In some cases, the network entity 105-*c* may identify the change in the channel link quality according to one or more messages received from the UE 115-*b* (e.g., SRS measurements or CSI-RS feedback reports). For example, the network entity 105-*c* may use the one or more messages as inputs to a change detection algorithm to identify the change in the channel link quality, which may support the network entity 105-*c* detecting the change before the server 405 (e.g., before a subsequent RTCP feedback message).

At 440, the server 405 may transmit application data (e.g., video frame data) to the network entity 105-*c* according to the data rate 415-*a*. For example, the server 405 may encode a single data stream according to the data rate 415-*a*, which may carry multiple PDU sets associated with the application data.

At 445, the network entity 105-*c* may relay, to the UE 115-*c*, the data stream received from the server 405 according to the data rate 415-*c* (e.g., a relatively low bitrate). In some cases, the network entity 105-*c* may transcode the data stream using the one or more transcoding parameters included in the manifest file in response to detecting a variation (e.g., a decrease) in the channel link quality between the network entity 105-*c* and the UE 115-*c*. For example, the network entity 105-*c* may transcode, according to the transcoding parameters and as a function of instantaneous channel quality, buffered video packets from the data rate 415-*a* (e.g., as encoded by the server 405) to the data rate 415-*c*. In some cases, transcoding the data stream may reduce latency associated with relaying the application data to the UE 115-*c* via a degraded wireless channel link quality.

Additionally, or alternatively, the network entity 105-*c* may terminate (e.g., interrupt, preempt, or the like) a data transmission prior to modifying the application data. For example, the network entity 105-*c* may begin to forward the application data according to the data rate 415-*a*, and may terminate the transmission in response to the application data exceeding a PDU set delay budget. In such an example, the network entity 105-*c* may discard PDU sets associated with the application data, and may retransmit the modified application data (e.g., after transcoding the data stream to the data rate 415-*c*).

At 450, the UE 115-*c* may transmit, to the server 405, a bitrate update. In some cases, the bitrate update may be a periodic RTCP feedback report indicating a current channel link quality between the UE 115-*c* and the network entity 105-*c*. For example, the UE 115-*c* may identify the current channel link quality as the channel link quality 410-*b*, and may indicate a relatively weak channel link quality in the bitrate update.

At 455, the server 405 may transmit application data to the network entity 105-*c*. In some cases, the application data may be encoded to accommodate the channel link quality 410-*b* (e.g., a relatively weak channel link quality) based on the server 405 receiving the bitrate update. For example, the server 305 may encode the data stream according to the data rate 415-*b*, which may be a relatively low bitrate (e.g., a bitrate appropriate for the channel link quality 410-*b*).

At 460, the network entity 105-*c* may forward the application data to the UE 115-*c*. In some cases, the network entity 105-*c* may not modify the application data, and may forward the data stream according to the data rate 415-*b*.

In some cases, the channel link quality between the UE 115-*c* and the network entity 105-*c* may change from the channel link quality 410-*b* (e.g., a relatively weak channel link quality) to the channel link quality 410-*c* (e.g., a relatively strong channel link quality).

At 465, the UE 115-*c* may transmit, to the server 405, a bitrate update. In some cases, the bitrate update may be a periodic RTCP feedback report indicating a current channel link quality between the UE 115-*c* and the network entity 105-*c*. For example, the UE 115-*c* may identify the current channel link quality as the channel link quality 410-*c*, and may indicate a relatively strong channel link quality in the bitrate update.

At 470, the server 405 may transmit application data to the network entity 105-*c* according to the data rate 415-*a*. For example, the server 405 may transmit a data stream carrying multiple PDU sets associated with the application data, which may be encoded according to the data rate 415-*a*.

At 475, the network entity 105-*c* may relay, to the UE 115-*c*, the application data received from the server 405. In some examples, the network entity 105-*c* may not modify the application data based on a current channel link quality between the network entity 105-*c* and the UE 115-*c*. For example, the network entity 105-*c* may identify the current channel link quality as the channel link quality 410-*c* (e.g., a relatively strong channel link quality), and may forward the application data without transcoding the data stream.

Figure 5:
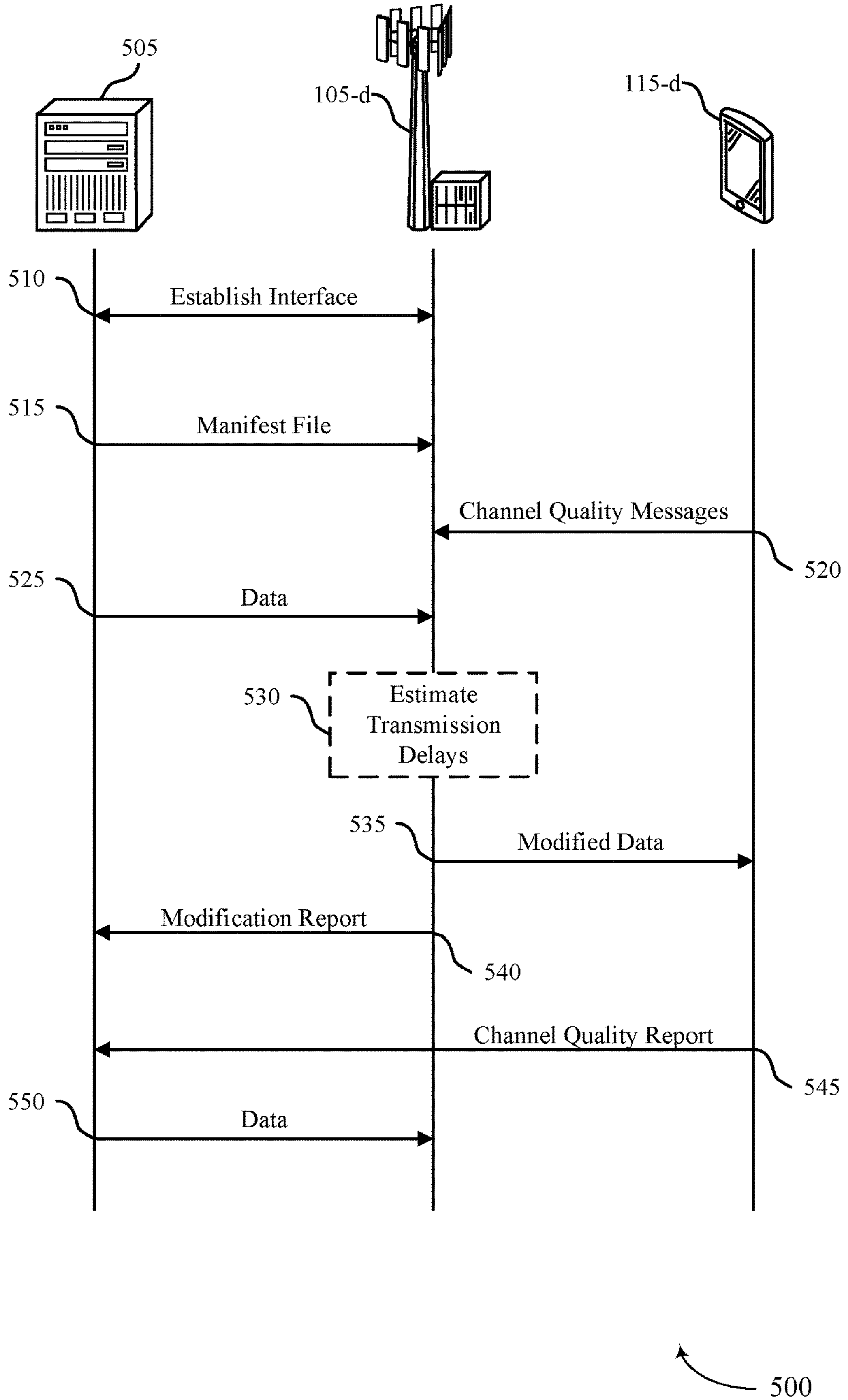
FIG. 5 shows an example of a process flow that supports relaying video frame data according to channel quality in accordance with one or more aspects of the present disclosure.

FIG. 5 shows an example of a process flow 500 that supports relaying video frame data according to channel quality in accordance with one or more aspects of the present disclosure. In some cases, the process flow 400 may implement, or be implemented by, one or more aspects of the wireless communications system 100, the wireless communications system 200, the process flow 300, and the process flow 400. For example, the process flow 500 may include examples of signaling between a server 505, a network entity 105-*d*, and a UE 115-*d*, which may be examples of corresponding devices described with references to FIGS. 1 through 4. Alternative examples of the following may be implemented, where some processes are performed in a different order than described or are not performed. In some cases, processes may include additional features not mentioned below, or further processes may be added.

At 510, the server 505 and the network entity 105-*d* may establish an interface to support data communications between the server 505 and the network entity 105-*d*. For example, the server 505 and the network entity 105-*d* may use one or more NEFs to establish the interface.

At 515, the server 505 may transmit a manifest file (e.g., a first signal) to the network entity 105-*d*. In some examples, the manifest file may indicate a quantity of one or more data streams associated with a video frame and may indicate a mapping scheme for the quantity of the one or more data streams. The mapping scheme may indicate a mapping of the one or more data streams to one or more PDU sets associated with the video frame. For example, the mapping scheme may indicate a correspondence between each data stream of the one or more data streams and a respective PDU set of the one or more PDU sets. Additionally, or alternatively, the manifest file may include an indication of one or more transcoding parameters associated with at least a first data stream of the one or more data streams.

At 520, the network entity 105-*d* may receive one or more messages from the UE 115-*d*. In some examples, the one or more messages may support the network entity 105-*d* detecting a change in a channel link quality between the network entity 105-*d* and the UE 115-*d*. For example, the one or more messages may include one or more SRSs, and the network entity 105-*d* may measure the SRSs to determine one or more channel quality measurements. As another example, the one or more messages may include CSI-RS feedback reports, which may include channel quality measurements made by the UE 115-*d* (e.g., measuring reference signals received from the network entity 105-*d*). In some cases, the network entity 105-*d* may detect the change in the channel link quality using a change detection algorithm. For example, the network entity 105-*d* may use the channel quality measurements as inputs to the change detection algorithm to identify that the channel link quality has degraded.

At 525, the server 505 may transmit, to the network entity 105-*d*, the one or more data streams carrying the one or more PDU sets. For example, the network entity 105-*d* may receive each of the one or more data streams that correspond to respective PDU sets of the one or more PDU sets. As another example, the network entity 105-*d* may receive at least a first data stream carrying the one or more PDU sets, which may be encoded according to a first bitrate (e.g., indicated by transcoding parameters included in the manifest file).

At 530, the network entity 105-*d* may estimate one or more transmission delays associated with each received data stream. For example, if the network entity 105-*d* receives each data stream of the one or more data streams, the network entity 105-*d* may estimate a respective transmission delay for each data stream.

At 535, the network entity 105-*d* may transmit modified data to the UE 115-*d*. For example, the network entity 105-*d* may transmit a signal (e.g., a second signal) carrying at least a first PDU set of the one or more PDU sets based on the channel link quality (e.g., detecting a degraded channel link quality), the first PDU set corresponding to a first data stream of the one or more data streams (e.g., according to the mapping scheme). In some cases, the network entity 105-*d* may terminate (e.g., interrupt, preempt, or the like) a transmission of a signal (e.g., a third signal) carrying the one or more PDU sets based on the third signal exceeding a PDU set delay budget, and may retransmit the signal after modifying the data.

In some examples, the network entity 105-*d* may modify the data by selectively forwarding data streams to the UE 115-*d*. For example, the network entity 105-*d* may select the first data stream based on an estimated transmission delay associated with the first data stream, a first coding rate associated with the first data stream satisfying a threshold corresponding to the channel link quality (e.g., a QoS constraint or a PDB constraint), or both. In such an example, the network entity 105-*d* may discard one or more second PDU sets corresponding to one or more second data streams of the one or more data streams (e.g., by looking up relevant PDU set IDs in the manifest file) based on one or more second coding rates associated with the one or more second data streams failing to satisfy the threshold.

As another example, the network entity 105-*d* may transcode the first data stream based on the degraded channel link quality. For example, the server 505 may encode the first data stream according to the first bitrate (e.g., indicated by transcoding parameters included in the manifest file) and the network entity 105-*d* may transcode the first data stream according to a second bitrate different from the first bitrate (e.g., a lower bitrate).

At 540, the network entity 105-*d* may transmit, to the server 505, an indication of the modifications made to the data forwarded to the UE 115-*d*. For example, the network entity 105-*d* may indicate the subset of the one or more data streams selected to forward to the UE 115-*d*, may indicate a bitrate associated with the forwarded data (e.g., the second bitrate), or both. In some cases, the server 505 may use such information to adapt the encoding of one or more subsequent video frames (e.g., inserting I-frames, adjusting an I-frame reference, or both), which may mitigate leakage and drift associated with the video frames.

At 545, the server 505 may receive, from the UE 115-*d*, a channel quality report, which may indicate that the channel link quality between the UE 115-*d* and the network entity 105-*d* has degraded. In some cases, the channel quality report may be a periodic RTCP feedback report.

At 550, the server 505 may transmit, to the network entity 105-*d*, at least a subset of the one or more PDU sets based on receiving the channel quality report. For example, the server 505 may modify the data to accommodate the degraded channel link quality.

Figure 6:
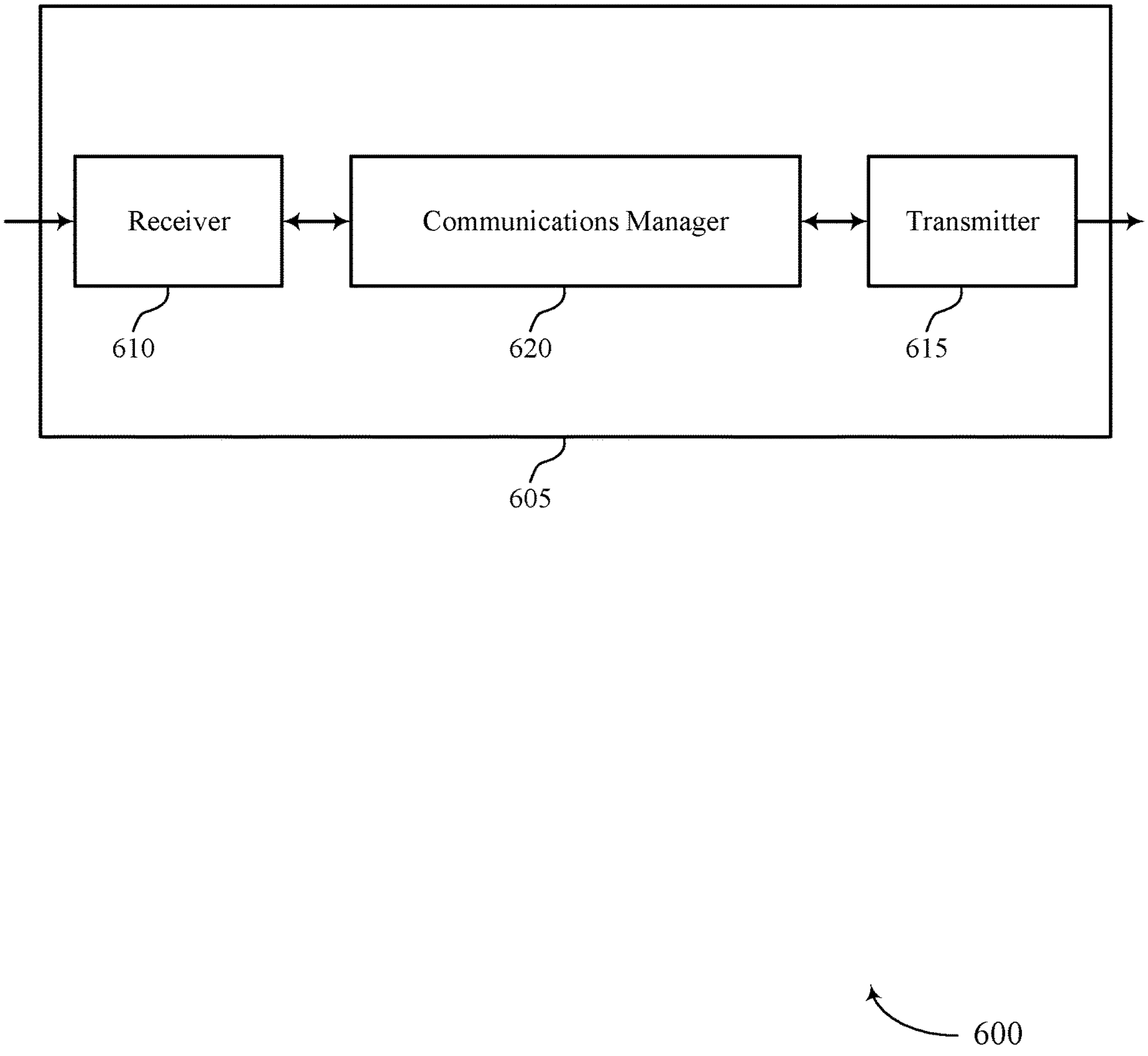
FIGS. 6 and 7 show block diagrams of devices that support relaying video frame data according to channel quality in accordance with one or more aspects of the present disclosure.

FIG. 6 shows a block diagram 600 of a device 605 that supports relaying video frame data according to channel quality in accordance with one or more aspects of the present disclosure. The device 605 may be an example of aspects of a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of relaying video frame data according to channel quality as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a network entity in accordance with examples as disclosed herein. For example, the communications manager 620 is capable of, configured to, or operable to support a means for receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame. The communications manager 620 is capable of, configured to, or operable to support a means for receiving, from the server, the one or more data streams carrying the one or more PDU sets. The communications manager 620 is capable of, configured to, or operable to support a means for transmitting, to a UE, a second signal carrying at least a first PDU set of the one or more PDU sets based on a channel link quality between the network entity and the UE, the first PDU set corresponding to a first data stream of the one or more data streams in accordance with the mapping scheme.

Additionally, or alternatively, the communications manager 620 may support wireless communications at a server in accordance with examples as disclosed herein. For example, the communications manager 620 is capable of, configured to, or operable to support a means for transmitting, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame. The communications manager 620 is capable of, configured to, or operable to support a means for transmitting, to the network entity, the one or more data streams carrying the one or more PDU sets.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced latency when forwarding communications via a degraded wireless channel, which may enhance the performance of XR services.

Figure 7:
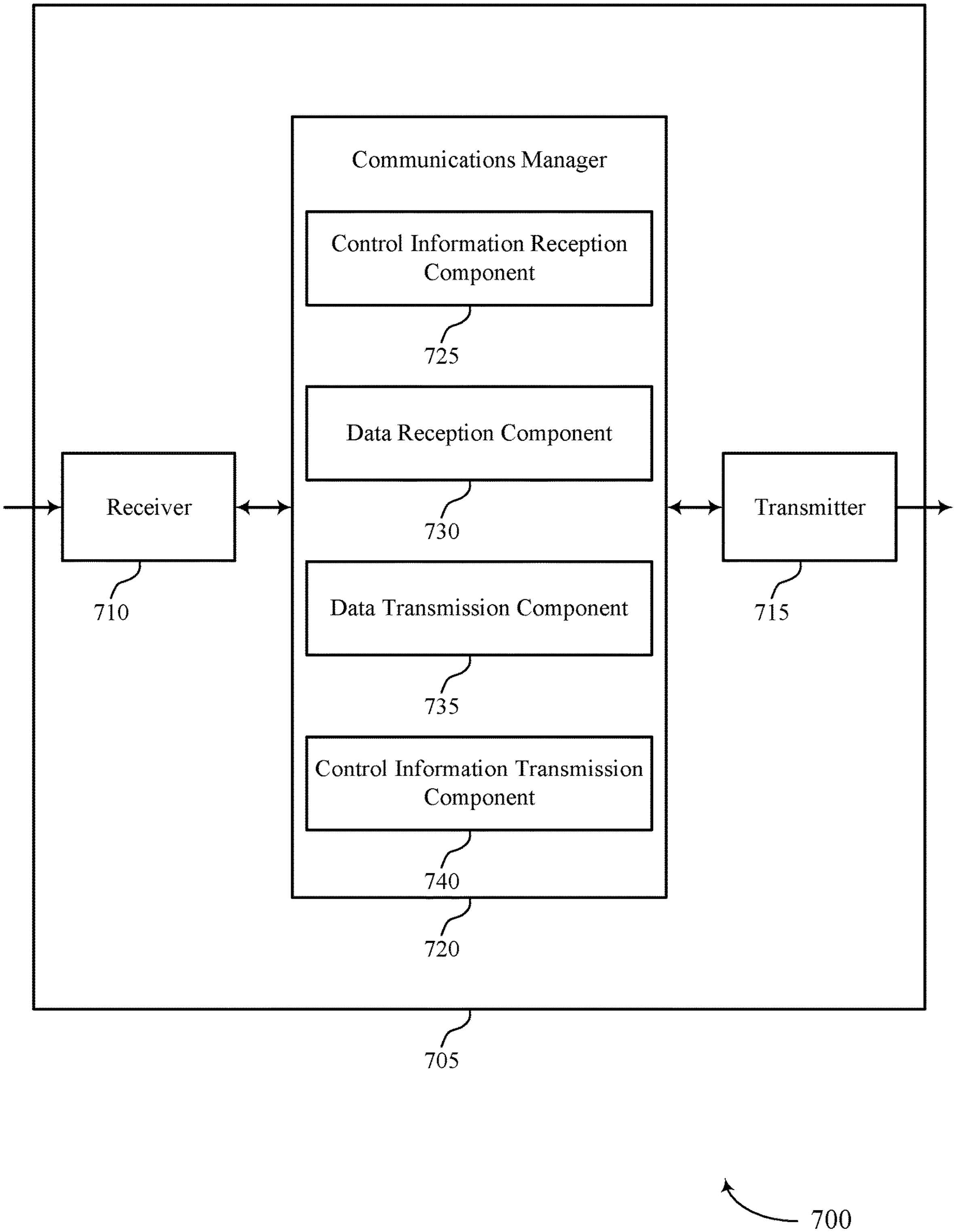

FIG. 7 shows a block diagram 700 of a device 705 that supports relaying video frame data according to channel quality in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of relaying video frame data according to channel quality as described herein. For example, the communications manager 720 may include a control information reception component 725, a data reception component 730, a data transmission component 735, a control information transmission component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a network entity in accordance with examples as disclosed herein. The control information reception component 725 is capable of, configured to, or operable to support a means for receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame. The data reception component 730 is capable of, configured to, or operable to support a means for receiving, from the server, the one or more data streams carrying the one or more PDU sets. The data transmission component 735 is capable of, configured to, or operable to support a means for transmitting, to a UE, a second signal carrying at least a first PDU set of the one or more PDU sets based on a channel link quality between the network entity and the UE, the first PDU set corresponding to a first data stream of the one or more data streams in accordance with the mapping scheme.

Additionally, or alternatively, the communications manager 720 may support wireless communications at a server in accordance with examples as disclosed herein. The control information transmission component 740 is capable of, configured to, or operable to support a means for transmitting, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame. The data transmission component 735 is capable of, configured to, or operable to support a means for transmitting, to the network entity, the one or more data streams carrying the one or more PDU sets.

Figure 8:
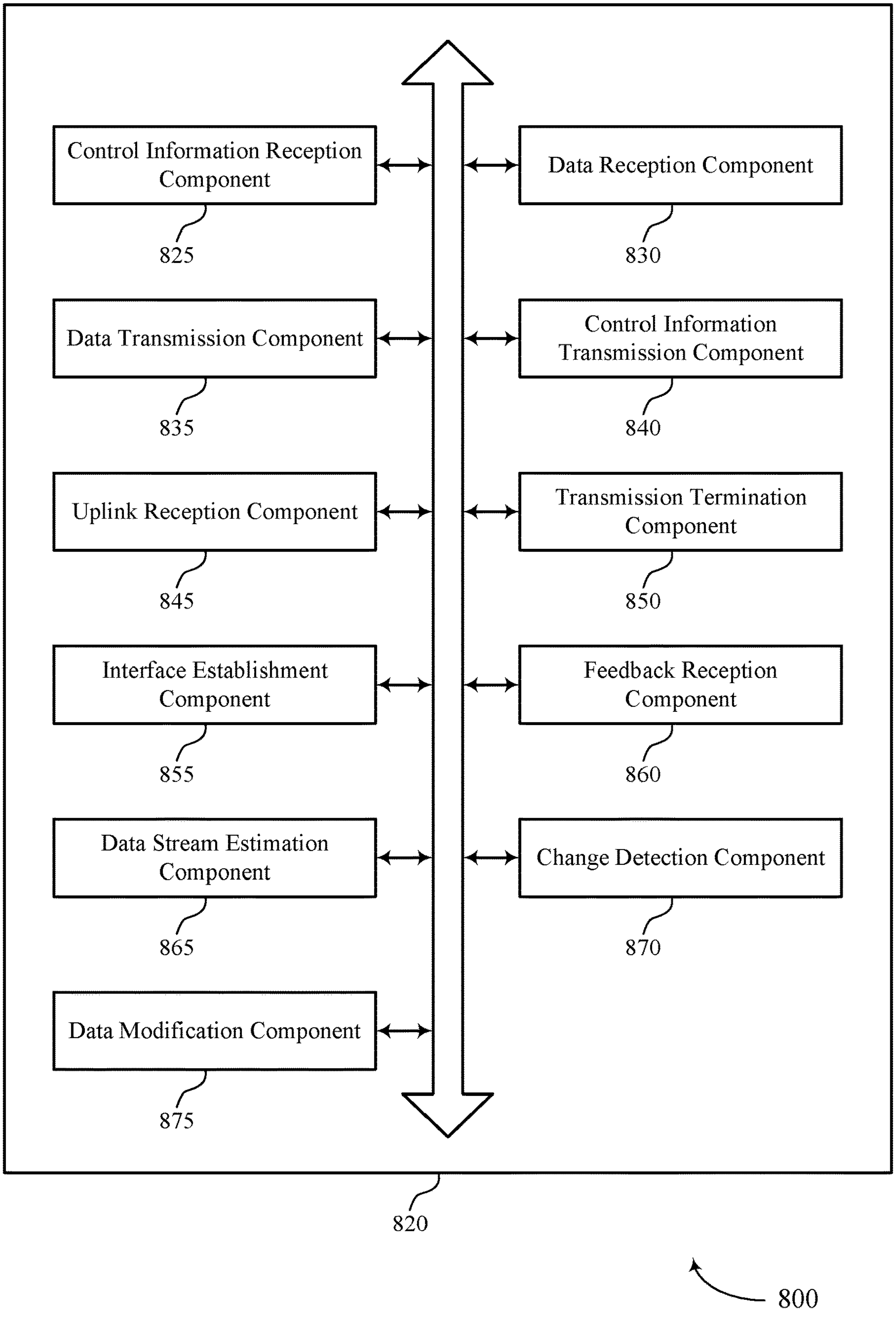
FIG. 8 shows a block diagram of a communications manager that supports relaying video frame data according to channel quality in accordance with one or more aspects of the present disclosure.

FIG. 8 shows a block diagram 800 of a communications manager 820 that supports relaying video frame data according to channel quality in accordance with one or more aspects of the present disclosure. The communications manager 820 may be an example of aspects of a communications manager 620, a communications manager 720, or both, as described herein. The communications manager 820, or various components thereof, may be an example of means for performing various aspects of relaying video frame data according to channel quality as described herein. For example, the communications manager 820 may include a control information reception component 825, a data reception component 830, a data transmission component 835, a control information transmission component 840, an uplink reception component 845, a transmission termination component 850, an interface establishment component 855, a feedback reception component 860, a data stream estimation component 865, a change detection component 870, a data modification component 875, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a network entity in accordance with examples as disclosed herein. The control information reception component 825 is capable of, configured to, or operable to support a means for receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame. The data reception component 830 is capable of, configured to, or operable to support a means for receiving, from the server, the one or more data streams carrying the one or more PDU sets. The data transmission component 835 is capable of, configured to, or operable to support a means for transmitting, to a UE, a second signal carrying at least a first PDU set of the one or more PDU sets based on a channel link quality between the network entity and the UE, the first PDU set corresponding to a first data stream of the one or more data streams in accordance with the mapping scheme.

In some examples, the uplink reception component 845 is capable of, configured to, or operable to support a means for receiving one or more messages from the UE. In some examples, the data reception component 830 is capable of, configured to, or operable to support a means for transmitting the second signal based on a change in the channel link quality based on the one or more messages.

In some examples, the data stream estimation component 865 is capable of, configured to, or operable to support a means for estimating a respective transmission delay for each data stream of the one or more data streams based on the one or more messages, where the second signal is transmitted based on the respective transmission delay for each data stream.

In some examples, to support transmitting the second signal, the data transmission component 835 is capable of, configured to, or operable to support a means for transmitting the second signal carrying at least the first PDU set according to a first coding rate that satisfies a threshold corresponding to the channel link quality, where the threshold is based on the one or more messages.

In some examples, the data modification component 875 is capable of, configured to, or operable to support a means for discarding one or more second PDU sets corresponding to one or more second data streams of the one or more data streams based on one or more second coding rates associated with the one or more second data streams failing to satisfy the threshold, where the one or more second PDU sets are identified in accordance with the mapping scheme.

In some examples, the change detection component 870 is capable of, configured to, or operable to support a means for detecting the change in the channel link quality based on a change detection algorithm, where the change detection algorithm is based on the one or more messages.

In some examples, to support receiving the one or more messages, the uplink reception component 845 is capable of, configured to, or operable to support a means for receiving one or more SRSs used to detect the change in the channel link quality.

In some examples, to support receiving the one or more messages, the uplink reception component 845 is capable of, configured to, or operable to support a means for receiving one or more feedback messages indicating channel quality information at the UE, where the change in the channel link quality is detected based on the channel quality information.

In some examples, the mapping scheme indicates a correspondence between each data stream of the one or more data streams and a respective PDU set of the one or more PDU sets.

In some examples, to support receiving the first signal, the control information reception component 825 is capable of, configured to, or operable to support a means for receiving, in the first signal, an indication of one or more transcoding parameters associated with the first data stream.

In some examples, the one or more transcoding parameters include a first bitrate used to transcode the one or more data streams, and the data modification component 875 is capable of, configured to, or operable to support a means for transcoding the first data stream in accordance with a second bitrate different from the first bitrate based on the channel link quality.

In some examples, the transmission termination component 850 is capable of, configured to, or operable to support a means for terminating a transmission of a third signal carrying the one or more PDU sets based on the third signal exceeding a PDU set delay budget.

In some examples, the control information transmission component 840 is capable of, configured to, or operable to support a means for transmitting, to the server, an indication of a subset of the one or more data streams selected for the second signal, an indication of a bitrate associated with the second signal, or both.

In some examples, the interface establishment component 855 is capable of, configured to, or operable to support a means for establishing an interface with the server using one or more NEFs, the first signal received via the interface.

Additionally, or alternatively, the communications manager 820 may support wireless communications at a server in accordance with examples as disclosed herein. The control information transmission component 840 is capable of, configured to, or operable to support a means for transmitting, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame. In some examples, the data transmission component 835 is capable of, configured to, or operable to support a means for transmitting, to the network entity, the one or more data streams carrying the one or more PDU sets.

In some examples, the control information reception component 825 is capable of, configured to, or operable to support a means for receiving, from the network entity, an indication that the network entity forwarded, to the UE, a second signal carrying at least a first PDU set of the one or more PDU sets based on a channel link quality between the network entity and the UE, the first PDU set corresponding to a first data stream in accordance with the mapping scheme.

In some examples, the feedback reception component 860 is capable of, configured to, or operable to support a means for receiving, from the UE, an indication that a channel link quality between the network entity and the UE has degraded. In some examples, the data transmission component 835 is capable of, configured to, or operable to support a means for transmitting, to the network entity, a second signal carrying at least a subset of the one or more PDU sets based on the indication.

In some examples, the mapping scheme indicates a correspondence between each data stream of the one or more data streams and a respective PDU set of the one or more PDU sets.

In some examples, transmitting, in the first signal, an indication of one or more transcoding parameters associated with the first data stream.

In some examples, the interface establishment component 855 is capable of, configured to, or operable to support a means for establishing an interface with the network entity using one or more NEFs, the first signal transmitted via the interface.

Figure 9:
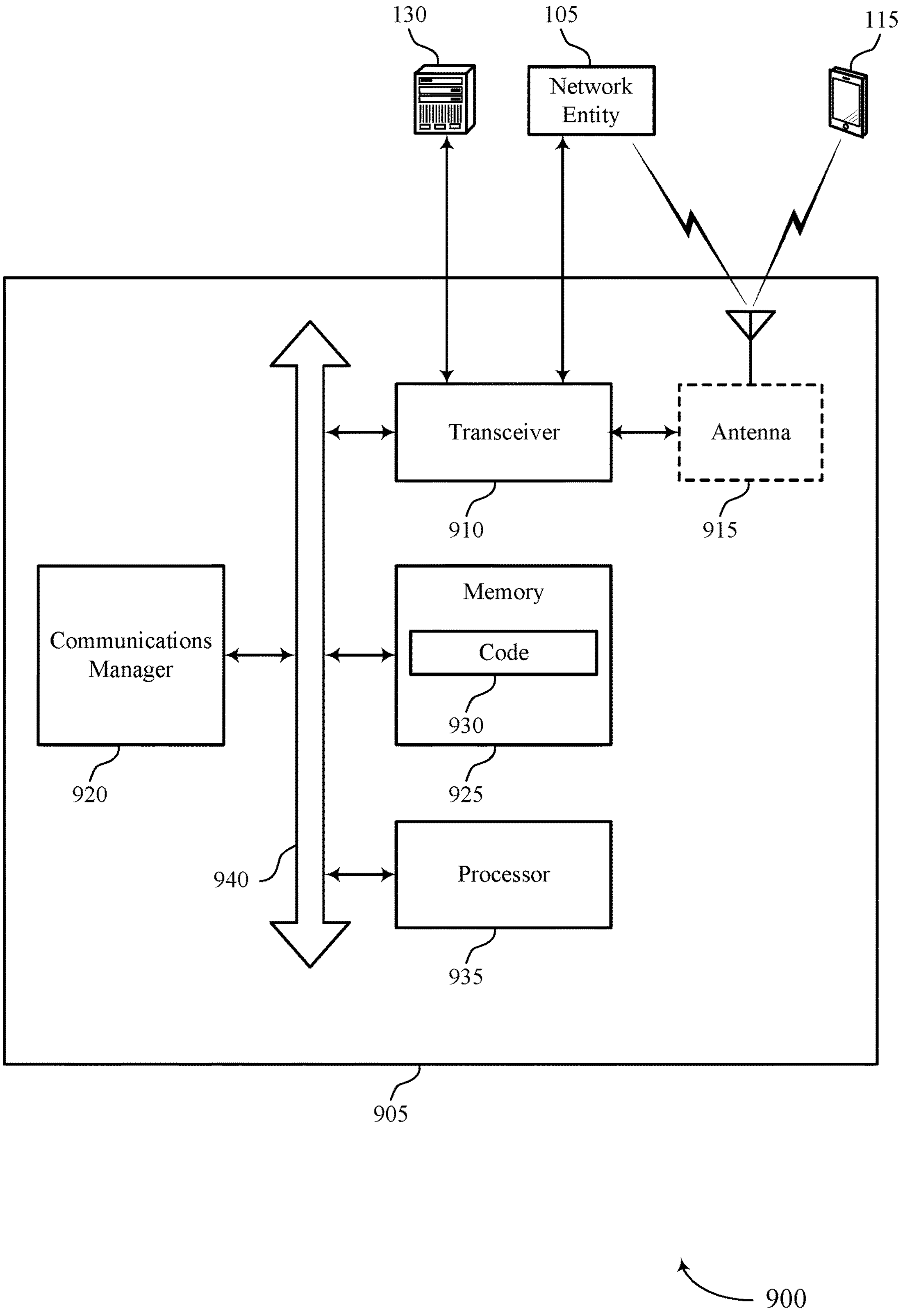
FIG. 9 shows a diagram of a system including a device that supports relaying video frame data according to channel quality in accordance with one or more aspects of the present disclosure.

FIG. 9 shows a diagram of a system 900 including a device 905 that supports relaying video frame data according to channel quality in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting relaying video frame data according to channel quality). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a network entity in accordance with examples as disclosed herein. For example, the communications manager 920 is capable of, configured to, or operable to support a means for receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame. The communications manager 920 is capable of, configured to, or operable to support a means for receiving, from the server, the one or more data streams carrying the one or more PDU sets. The communications manager 920 is capable of, configured to, or operable to support a means for transmitting, to a UE, a second signal carrying at least a first PDU set of the one or more PDU sets based on a channel link quality between the network entity and the UE, the first PDU set corresponding to a first data stream of the one or more data streams in accordance with the mapping scheme.

Additionally, or alternatively, the communications manager 920 may support wireless communications at a server in accordance with examples as disclosed herein. For example, the communications manager 920 is capable of, configured to, or operable to support a means for transmitting, to a network entity, a first signal indicating a quantity of one or more data streams associated with a video frame for a UE and indicating a mapping scheme for the quantity of the one or more data streams, where the mapping scheme indicates a mapping of the one or more data streams to one or more PDU sets associated with the video frame. The communications manager 920 is capable of, configured to, or operable to support a means for transmitting, to the network entity, the one or more data streams carrying the one or more PDU sets.

By including or configuring the communications manager 920 in accordance with examples as described herein, the device 905 may support techniques for reduced latency when forwarding communications via a degraded wireless channel, which may enhance the performance of XR services.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of relaying video frame data according to channel quality as described herein, or the processor 935 and the memory 925 may be otherwise configured to perform or support such operations.

Figure 10:
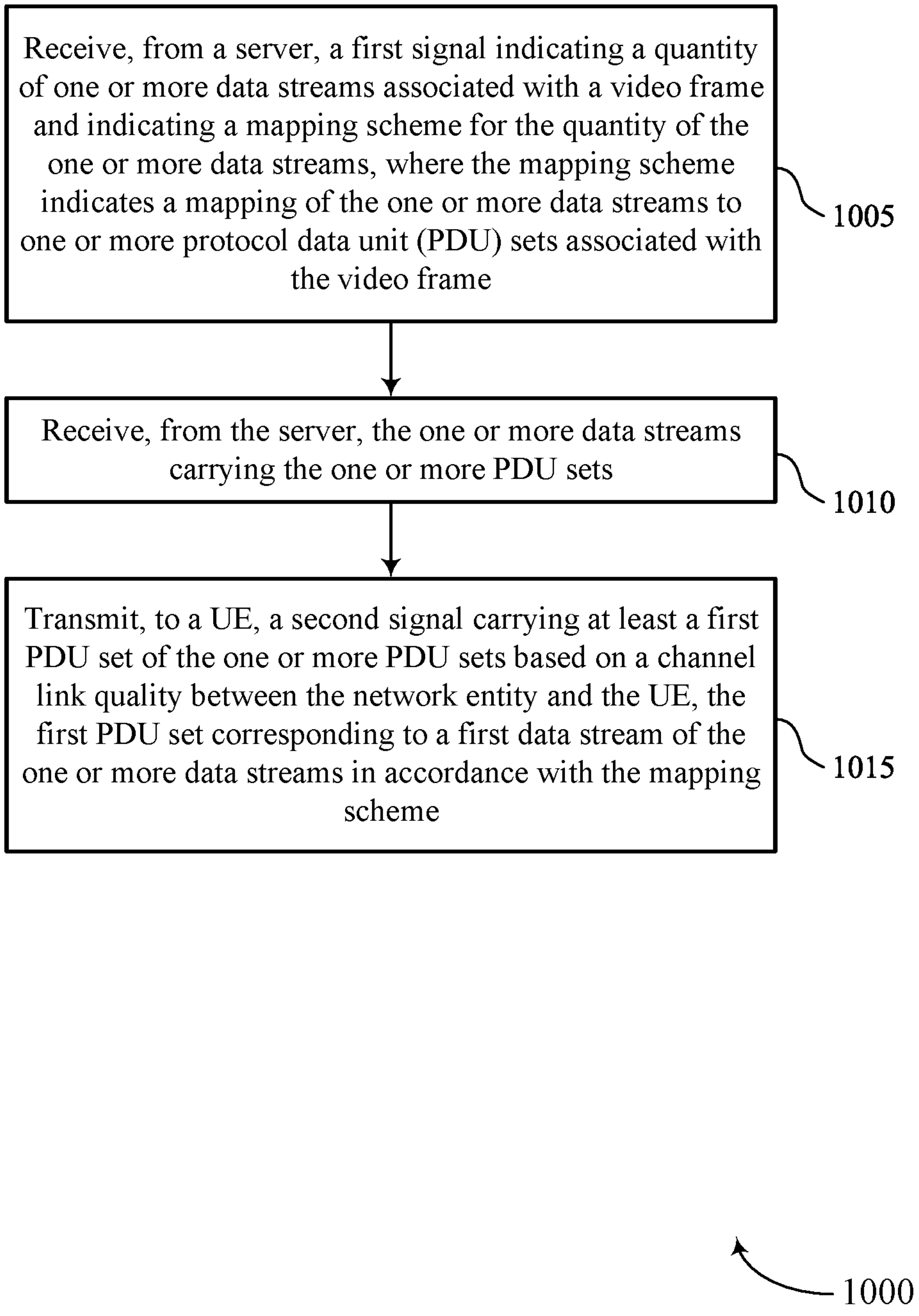
FIG. 10 shows a flowchart illustrating methods that support relaying video frame data according to channel quality in accordance with one or more aspects of the present disclosure.

FIG. 10 shows a flowchart illustrating a method 1000 that supports relaying video frame data according to channel quality in accordance with aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include receiving, from a server, a first signal indicating a quantity of one or more data streams associated with a video frame and indicating a mapping scheme for the quantity of the one or more data streams, where the mapping scheme indicates a mapping of the one or more data streams to one or more PDU sets associated with the video frame. The operations of block 1005 may be performed in accordance with examples as disclosed herein. In some examples, aspects of the operations of 1005 may be performed by a control information reception component 825 as described with reference to FIG. 8.

At 1010, the method may include receiving, from the server, the one or more data streams carrying the one or more PDU sets. The operations of block 1010 may be performed in accordance with examples as disclosed herein. In some examples, aspects of the operations of 1010 may be performed by a data reception component 830 as described with reference to FIG. 8.

At 1015, the method may include transmitting, to a UE, a second signal carrying at least a first PDU set of the one or more PDU sets based on a channel link quality between the network entity and the UE, the first PDU set corresponding to a first data stream of the one or more data streams in accordance with the mapping scheme. The operations of block 1015 may be performed in accordance with examples as disclosed herein. In some examples, aspects of the operations of 1015 may be performed by a data transmission component 835 as described with reference to FIG. 8.

The following provides an overview of aspects of the present disclosure:

Aspect 1: A method for wireless communications at a network entity, comprising: receiving, from a server, a first signal indicating a quantity of one or more data streams associated with a video frame and indicating a mapping scheme for the quantity of the one or more data streams, wherein the mapping scheme indicates a mapping of the one or more data streams to one or more PDU sets associated with the video frame; receiving, from the server, the one or more data streams carrying the one or more PDU sets; and transmitting, to a UE, a second signal carrying at least a first PDU set of the one or more PDU sets based at least in part on a channel link quality between the network entity and the UE, the first PDU set corresponding to a first data stream of the one or more data streams in accordance with the mapping scheme.

Aspect 2: The method of aspect 1, further comprising: receiving one or more messages from the UE; and transmitting the second signal based at least in part on a change in the channel link quality based at least in part on the one or more messages.

Aspect 3: The method of aspect 2, further comprising: estimating a respective transmission delay for each data stream of the one or more data streams based at least in part on the one or more messages, wherein the second signal is transmitted based at least in part on the respective transmission delay for each data stream.

Aspect 4: The method of any of aspects 2 through 3, wherein transmitting the second signal comprises: transmitting the second signal carrying at least the first PDU set according to a first coding rate that satisfies a threshold corresponding to the channel link quality, wherein the threshold is based at least in part on the one or more messages.

Aspect 5: The method of aspect 4, further comprising: discarding one or more second PDU sets corresponding to one or more second data streams of the one or more data streams based at least in part on one or more second coding rates associated with the one or more second data streams failing to satisfy the threshold, wherein the one or more second PDU sets are identified in accordance with the mapping scheme.

Aspect 6: The method of any of aspects 2 through 5, further comprising: detecting the change in the channel link quality based at least in part on a change detection algorithm, wherein the change detection algorithm is based at least in part on the one or more messages.

Aspect 7: The method of any of aspects 2 through 6, wherein receiving the one or more messages comprises: receiving one or more SRSs used to detect the change in the channel link quality.

Aspect 8: The method of any of aspects 2 through 6, wherein receiving the one or more messages comprises: receiving one or more feedback messages indicating channel quality information at the UE, wherein the change in the channel link quality is detected based at least in part on the channel quality information.

Aspect 9: The method of any of aspects 1 through 8, wherein the mapping scheme indicates a correspondence between each data stream of the one or more data streams and a respective PDU set of the one or more PDU sets.

Aspect 10: The method of any of aspects 1 through 9, wherein receiving the first signal comprises: receiving, in the first signal, an indication of one or more transcoding parameters associated with the first data stream.

Aspect 11: The method of aspect 10, wherein the one or more transcoding parameters comprise a first bitrate used to transcode the one or more data streams, the method further comprising: transcoding the first data stream in accordance with a second bitrate different from the first bitrate based at least in part on the channel link quality.

Aspect 12: The method of any of aspects 1 through 11, further comprising: terminating a transmission of a third signal carrying the one or more PDU sets based at least in part on the third signal exceeding a PDU set delay budget.

Aspect 13: The method of any of aspects 1 through 12, further comprising: transmitting, to the server, an indication of a subset of the one or more data streams selected for the second signal, an indication of a bitrate associated with the second signal, or both.

Aspect 14: The method of any of aspects 1 through 13, further comprising: establishing an interface with the server using one or more NEFs, the first signal received via the interface.

Aspect 15: A method for wireless communications at a server, comprising: transmitting, to a network entity, a first signal indicating a quantity of one or more data streams associated with a video frame for a UE and indicating a mapping scheme for the quantity of the one or more data streams, wherein the mapping scheme indicates a mapping of the one or more data streams to one or more PDU sets associated with the video frame; transmitting, to the network entity, the one or more data streams carrying the one or more PDU sets.

Aspect 16: The method of aspect 15, further comprising: receiving, from the network entity, an indication that the network entity forwarded, to the UE, a second signal carrying at least a first PDU set of the one or more PDU sets based at least in part on a channel link quality between the network entity and the UE, the first PDU set corresponding to a first data stream in accordance with the mapping scheme.

Aspect 17: The method of any of aspects 15 through 16, further comprising: receiving, from the UE, an indication that a channel link quality between the network entity and the UE has degraded; and transmitting, to the network entity, a second signal carrying at least a subset of the one or more PDU sets based at least in part on the indication.

Aspect 18: The method of any of aspects 15 through 17, wherein the mapping scheme indicates a correspondence between each data stream of the one or more data streams and a respective PDU set of the one or more PDU sets.

Aspect 19: The method of any of aspects 15 through 18, wherein transmitting the first signal comprising transmitting, in the first signal, an indication of one or more transcoding parameters associated with the first data stream.

Aspect 20: The method of any of aspects 15 through 19, further comprising: establishing an interface with the network entity using one or more NEFs, the first signal transmitted via the interface.

Aspect 21: An apparatus for wireless communications at a network entity, comprising a processor; memory coupled with the processor; and instructions stored in the memory and executable by the processor to cause the apparatus to perform a method of any of aspects 1 through 14.

Aspect 22: An apparatus for wireless communications at a network entity, comprising at least one means for performing a method of any of aspects 1 through 14.

Aspect 23: A non-transitory computer-readable medium storing code for wireless communications at a network entity, the code comprising instructions executable by a processor to perform a method of any of aspects 1 through 14.

Aspect 24: An apparatus for wireless communications at a server, comprising a processor; memory coupled with the processor; and instructions stored in the memory and executable by the processor to cause the apparatus to perform a method of any of aspects 15 through 20.

Aspect 25: An apparatus for wireless communications at a server, comprising at least one means for performing a method of any of aspects 15 through 20.

Aspect 26: A non-transitory computer-readable medium storing code for wireless communications at a server, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity for wireless communications, comprising:

at least one processor; and at least one memory coupled with the at least one processor, the at least one memory storing instructions executable by the at least one processor to cause the network entity to:

receive, from a server, a first signal indicating a plurality of data streams associated with a video frame and indicating a mapping scheme for the plurality of data streams, wherein the mapping scheme indicates a mapping of the plurality of data streams to a plurality of protocol data unit (PDU) sets associated with the video frame, wherein the mapping indicates a correspondence between a respective identifier of each data stream of the plurality of data streams and a respective sequence number for each PDU set of the plurality of PDU sets;

receive, from the server, the plurality of data streams carrying the plurality of PDU sets;

discard one or more first PDU sets of the plurality of PDU sets corresponding to one or more first data streams of the plurality of data streams based at least in part on one or more first coding rates associated with the one or more first data streams failing to satisfy a threshold corresponding to a channel link quality between the network entity and a user equipment (UE), wherein the one or more first PDU sets are identified in accordance with the mapping between a respective first identifier of each data stream of the plurality of data streams and a respective first sequence number for each first PDU set of the one or more first PDU sets; and transmit, to the UE, a second signal carrying at least a second PDU set of the plurality of PDU sets based at least in part on a second coding rate associated with a second data stream of the plurality of data streams satisfying the threshold, the second PDU set corresponding to the second data stream in accordance with the mapping scheme.

2. The network entity of claim 1, wherein the instructions are further executable by the at least one processor to cause the network entity to:

receive one or more messages from the UE; and transmit the second signal based at least in part on a change in the channel link quality based at least in part on the one or more messages.

3. The network entity of claim 2, wherein the instructions are further executable by the at least one processor to cause the network entity to:

estimate a respective transmission delay for each data stream of the plurality of data streams based at least in part on the one or more messages, wherein the second signal is transmitted based at least in part on the respective transmission delay for each data stream.

4. The network entity of claim 2, wherein the instructions are further executable by the at least one processor to cause the network entity to:

detect the change in the channel link quality based at least in part on a change detection algorithm, wherein the change detection algorithm is based at least in part on the one or more messages.

5. The network entity of claim 2, wherein the instructions to receive the one or more messages are executable by the at least one processor to cause the network entity to:

receive one or more sounding reference signals used to detect the change in the channel link quality.

6. The network entity of claim 2, wherein the instructions to receive the one or more messages are executable by the at least one processor to cause the network entity to:

receive one or more feedback messages indicating channel quality information at the UE, wherein the change in the channel link quality is detected based at least in part on the channel quality information.

7. The network entity of claim 1, wherein the instructions to receive the first signal are executable by the at least one processor to cause the network entity to:

receive, in the first signal, an indication of one or more transcoding parameters associated with the second data stream.

8. The network entity of claim 7, wherein the one or more transcoding parameters comprise a first bitrate used to transcode the plurality of data streams, and the instructions are further executable by the at least one processor to cause the network entity to:

transcode the second data stream in accordance with a second bitrate different from the first bitrate based at least in part on the channel link quality.

9. The network entity of claim 1, wherein the instructions are further executable by the at least one processor to cause the network entity to:

terminate a transmission of a third signal carrying the plurality of PDU sets based at least in part on the third signal exceeding a PDU set delay budget.

10. The network entity of claim 1, wherein the instructions are further executable by the at least one processor to cause the network entity to:

transmit, to the server, an indication of a subset of the plurality of data streams selected for the second signal, an indication of a bitrate associated with the second signal, or both.

11. The network entity of claim 1, wherein the instructions are further executable by the at least one processor to cause the network entity to:

establish an interface with the server using one or more network exposure functions, the first signal received via the interface.

12. A server for wireless communications, comprising:

at least one processor; and at least one memory coupled with the at least one processor, the at least one memory storing instructions executable by the at least one processor to cause the server to:

transmit, to a network entity, a first signal indicating a plurality of data streams associated with a video frame for a user equipment (UE) and indicating a mapping scheme for the plurality of data streams, wherein the mapping scheme indicates a mapping of the plurality of data streams to a plurality of protocol data unit (PDU) sets associated with the video frame, wherein the mapping indicates a correspondence between a respective identifier of each data stream of the plurality of data streams and a respective sequence number for each PDU set of the plurality of PDU sets;

transmit, to the network entity, the plurality of data streams carrying the plurality of PDU sets; and receive, from the network entity, an indication that the network entity:

discarded one or more first PDU sets of the plurality of PDU sets corresponding to one or more first data streams of the plurality of data streams based at least in part on one or more first coding rates associated with the one or more first data streams failing to satisfy a threshold corresponding to a channel link quality between the network entity and the UE, the one or more first PDU sets corresponding to the one or more first data streams in accordance with the mapping scheme; and forwarded, to the UE, a second signal carrying at least a second PDU set of the plurality of PDU sets based at least in part on a second coding rate associated with a second data stream of the plurality of data streams satisfying the threshold, the second PDU set corresponding to the second data stream in accordance with the mapping scheme.

13. The server of claim 12, wherein the instructions are further executable by the at least one processor to cause the server to:

receive, from the UE, an indication that the channel link quality between the network entity and the UE has degraded; and transmit, to the network entity, a third signal carrying at least a subset of the plurality of PDU sets based at least in part on the indication.

14. The server of claim 12, wherein the instructions to transmit the first signal are executable by the at least one processor to cause the server to:

transmit, in the first signal, an indication of one or more transcoding parameters associated with the second data stream of the plurality of data streams.

15. The server of claim 12, wherein the instructions are further executable by the at least one processor to cause the server to:

establish an interface with the network entity using one or more network exposure functions, the first signal transmitted via the interface.

16. A method for wireless communications at a network entity, comprising:

receiving, from a server, a first signal indicating a plurality of data streams associated with a video frame and indicating a mapping scheme for the plurality of data streams, wherein the mapping scheme indicates a mapping of the plurality of data streams to a plurality of protocol data unit (PDU) sets associated with the video frame, wherein the mapping indicates a correspondence between a respective identifier of each data stream of the plurality of data streams and a respective sequence number for each PDU set of the plurality of PDU sets;

receiving, from the server, the plurality of data streams carrying the plurality of PDU sets;

discarding one or more first PDU sets of the plurality of PDU sets corresponding to one or more first data streams of the plurality of data streams based at least in part on one or more first coding rates associated with the one or more first data streams failing to satisfy a threshold corresponding to a channel link quality between the network entity and a user equipment (UE), wherein the one or more first PDU sets are identified in accordance with the mapping between a respective first identifier of each data stream of the plurality of data streams and a respective first sequence number for each first PDU set of the one or more first PDU sets; and transmitting, to the UE, a second signal carrying at least a second PDU set of the plurality of PDU sets based at least in part on a second coding rate associated with a second data stream of the plurality of data streams satisfying the threshold, the second PDU set corresponding to the second data stream in accordance with the mapping scheme.

17. The method of claim 16, further comprising:

receiving one or more messages from the UE; and transmitting the second signal based at least in part on a change in the channel link quality based at least in part on the one or more messages.

18. The method of claim 17, further comprising:

estimating a respective transmission delay for each data stream of the plurality of data streams based at least in part on the one or more messages, wherein the second signal is transmitted based at least in part on the respective transmission delay for each data stream.

19. The method of claim 17, further comprising:

detecting the change in the channel link quality based at least in part on a change detection algorithm, wherein the change detection algorithm is based at least in part on the one or more messages.

20. The method of claim 17, wherein receiving the one or more messages comprises:

receiving one or more sounding reference signals used to detect the change in the channel link quality.

21. The method of claim 17, wherein receiving the one or more messages comprises:

receiving one or more feedback messages indicating channel quality information at the UE, wherein the change in the channel link quality is detected based at least in part on the channel quality information.

22. The method of claim 16, wherein receiving the first signal comprises:

receiving, in the first signal, an indication of one or more transcoding parameters associated with the second data stream.

23. The method of claim 22, wherein the one or more transcoding parameters comprise a first bitrate used to transcode the plurality of data streams, the method further comprising:

transcoding the second data stream in accordance with a second bitrate different from the first bitrate based at least in part on the channel link quality.

24. The method of claim 16, further comprising:

terminating a transmission of a third signal carrying the plurality of PDU sets based at least in part on the third signal exceeding a PDU set delay budget.

25. The method of claim 16, further comprising:

transmitting, to the server, an indication of a subset of the plurality of data streams selected for the second signal, an indication of a bitrate associated with the second signal, or both.

26. The method of claim 16, further comprising:

establishing an interface with the server using one or more network exposure functions, the first signal received via the interface.

27. A method for wireless communications at a server, comprising:

transmitting, to a network entity, a first signal indicating a plurality of data streams associated with a video frame for a user equipment (UE) and indicating a mapping scheme for the plurality of data streams, wherein the mapping scheme indicates a mapping of the plurality of data streams to a plurality of protocol data unit (PDU) sets associated with the video frame, wherein the mapping indicates a correspondence between a respective identifier of each data stream of the plurality of data streams and a respective sequence number for each PDU set of the plurality of PDU sets;

transmitting, to the network entity, the plurality of data streams carrying the plurality of PDU sets; and receiving, from the network entity, an indication that the network entity:

discarded one or more first PDU sets of the plurality of PDU sets corresponding to one or more first data streams of the plurality of data streams based at least in part on one or more first coding rates associated with the one or more first data streams failing to satisfy a threshold corresponding to a channel link quality between the network entity and the UE, the one or more first PDU sets corresponding to the one or more first data streams in accordance with the mapping scheme; and forwarded, to the UE, a second signal carrying at least a second PDU set of the plurality of PDU sets based at least in part on a second coding rate associated with a second data stream of the plurality of data streams satisfying the threshold, the second PDU set corresponding to the second data stream in accordance with the mapping scheme.

28. The method of claim 27, further comprising:

receiving, from the UE, an indication that the channel link quality between the network entity and the UE has degraded; and transmitting, to the network entity, a third signal carrying at least a subset of the plurality of PDU sets based at least in part on the indication.

29. The method of claim 27, further comprising:

transmitting, in the first signal, an indication of one or more transcoding parameters associated with the second data stream of the plurality of data streams.

30. The method of claim 27, further comprising:

establishing an interface with the network entity using one or more network exposure functions, the first signal transmitted via the interface.

* * * * *